US012634744B2

(12) United States Patent
Cheng et al.

(10) Patent No.: US 12,634,744 B2
(45) Date of Patent: May 19, 2026

(54) CONTROL PLANE QUALITY OF SERVICE (QoS) MANAGEMENT

(71) Applicant: QUALCOMM Incorporated, San Diego, CA (US)

(72) Inventors: Hong Cheng, Basking Ridge, NJ (US); Gavin Bernard Horn, La Jolla, CA (US); Miguel Griot, La Jolla, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 18/391,431

(22) Filed: Dec. 20, 2023

(65) Prior Publication Data

US 2025/0212046 A1 Jun. 26, 2025

(51) Int. Cl.
*H04W 28/02* (2009.01)

(52) U.S. Cl.
CPC ... *H04W 28/0268* (2013.01); *H04W 28/0252* (2013.01)

(58) Field of Classification Search
CPC .................... H04W 28/0268; H04W 28/0252
See application file for complete search history.

(56) References Cited

U.S. PATENT DOCUMENTS

| 10,660,108 B2 * | 5/2020 | Kim ................... H04W 74/0833 |
| 12,316,448 B2 * | 5/2025 | Frenzel ................ H04L 1/0052 |

| 2016/0100350 A1 * | 4/2016 | Laraqui ................. H04W 48/16 |
| | | 370/328 |
| 2019/0174554 A1 * | 6/2019 | Deenoo ................ H04B 7/0617 |
| 2023/0276391 A1 * | 8/2023 | Qiao ................... H04L 43/0858 |
| | | 370/350 |
| 2024/0357639 A1 * | 10/2024 | Wang .................... H04W 72/20 |
| 2025/0202939 A1 * | 6/2025 | Da Silva .............. H04L 63/164 |
| 2025/0227737 A1 * | 7/2025 | Talarico ............... H04W 72/40 |

OTHER PUBLICATIONS

3GPP TR 23.799: "3rd Generation Partnership Project, Technical Specification Group Services and System Aspects, Study on Architecture for Next Generation System (Release 14)", V2.0.0 (Nov. 2016), 3GPP Draft, 23799-DIFF_121_200, Mobile Competence Centre, 650, Route Des, Lucioles, F-06921 Sophia-Antipolis Cedex, France, Dec. 1, 2016, pp. 1-531, XP051199312, pp. 126-131.
International Search Report and Written Opinion—PCT/US2024/059720—ISA/EPO—Apr. 14, 2025.

* cited by examiner

*Primary Examiner* — Minh Chau Nguyen
(74) *Attorney, Agent, or Firm* — Holland & Hart LLP

(57) ABSTRACT

Methods, systems, and devices for wireless communication are described. A wireless network may include a UE that may communicate with one or more service domains, such as via a network entity. A service domain may indicate control information to the network entity, the UE (e.g., via the network entity or directly), or both, where the control information may indicate a type of radio bearer associated with the service domain and a corresponding quality of service (QoS), among other parameters. Service domains may be associated with respective QoSes according to which signals are communicated via related types of radio bearers. As such, signaling may be communicated between the UE, the network entity, and the one or more service domains via radio bearers in accordance with corresponding QoSes.

49 Claims, 18 Drawing Sheets

910

920

915

905

900

130    105    115

Network Entity

Transceiver    Antenna 1210    1215

Communications Manager

Memory

Code

1230

1225

1220

1240

Processor

1235

1205

1200

Figure 13:
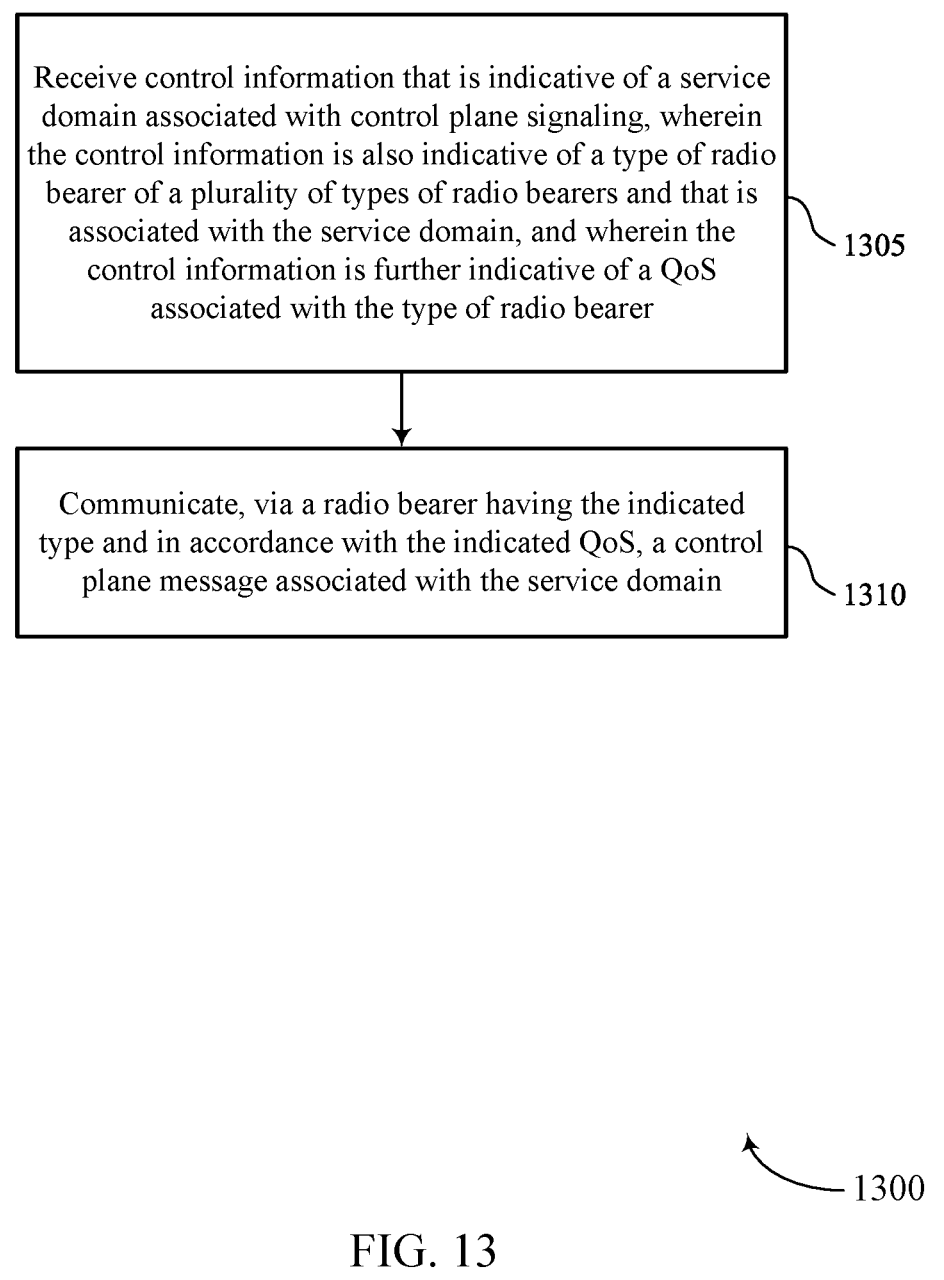

Receive control information that is indicative of a service domain associated with control plane signaling, wherein the control information is also indicative of a type of radio bearer of a plurality of types of radio bearers and that is associated with the service domain, and wherein the control information is further indicative of a QoS associated with the type of radio bearer

1305

Communicate, via a radio bearer having the indicated type and in accordance with the indicated QoS, a control plane message associated with the service domain

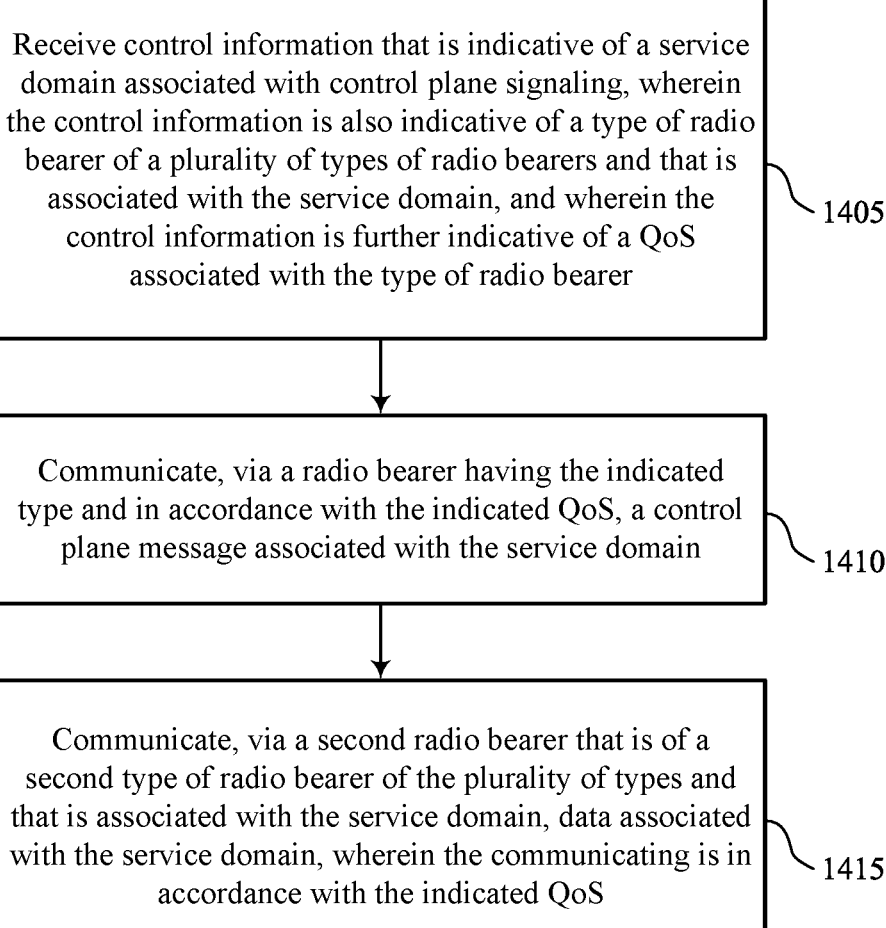

Receive control information that is indicative of a service domain associated with control plane signaling, wherein the control information is also indicative of a type of radio bearer of a plurality of types of radio bearers and that is associated with the service domain, and wherein the control information is further indicative of a QoS associated with the type of radio bearer

1405

Communicate, via a radio bearer having the indicated type and in accordance with the indicated QoS, a control plane message associated with the service domain

1410

Communicate, via a second radio bearer that is of a second type of radio bearer of the plurality of types and that is associated with the service domain, data associated with the service domain, wherein the communicating is in accordance with the indicated QoS

Figure 15:
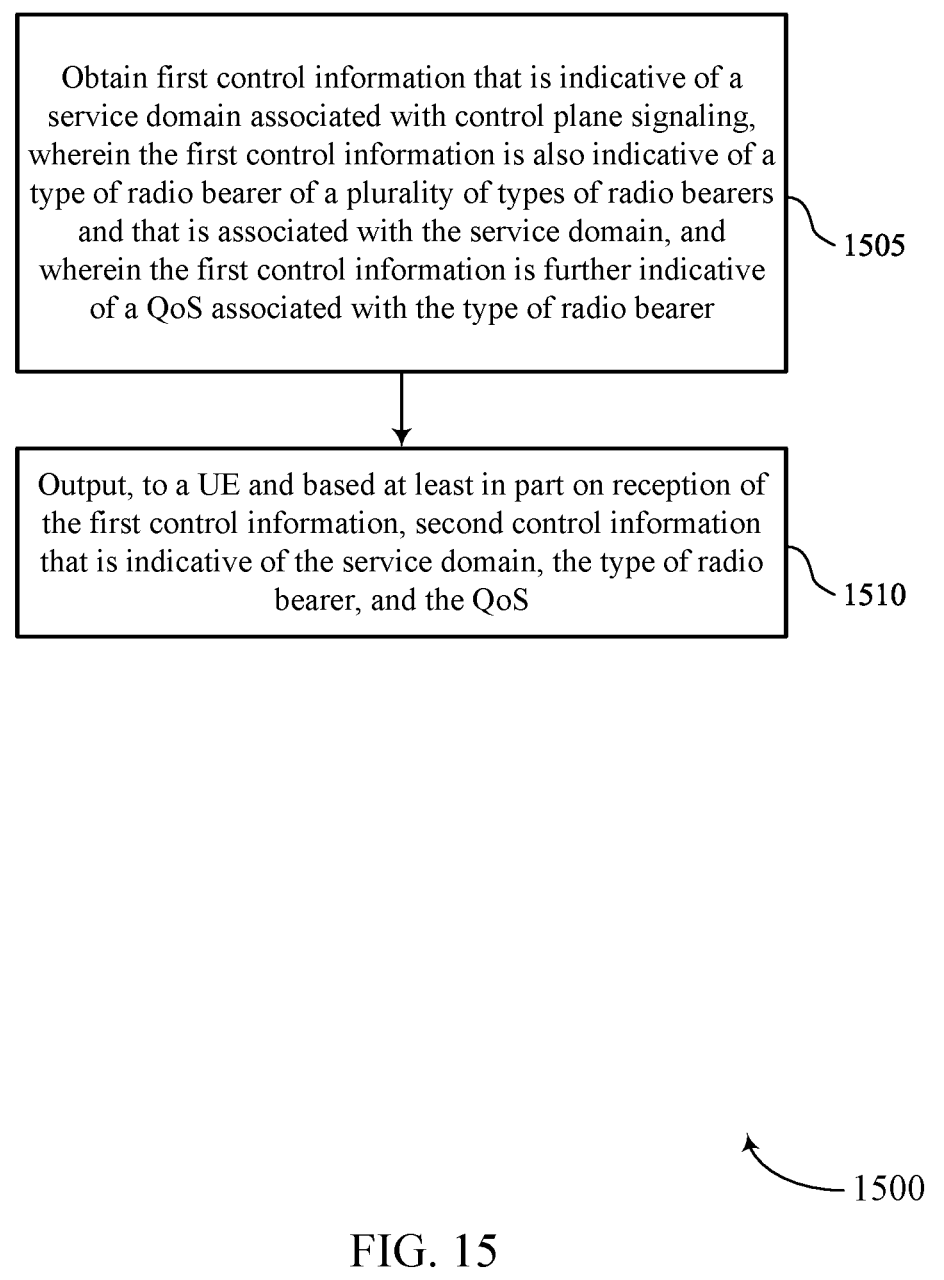

Obtain first control information that is indicative of a service domain associated with control plane signaling, wherein the first control information is also indicative of a type of radio bearer of a plurality of types of radio bearers and that is associated with the service domain, and wherein the first control information is further indicative of a QoS associated with the type of radio bearer

1505

Output, to a UE and based at least in part on reception of the first control information, second control information that is indicative of the service domain, the type of radio bearer, and the QoS

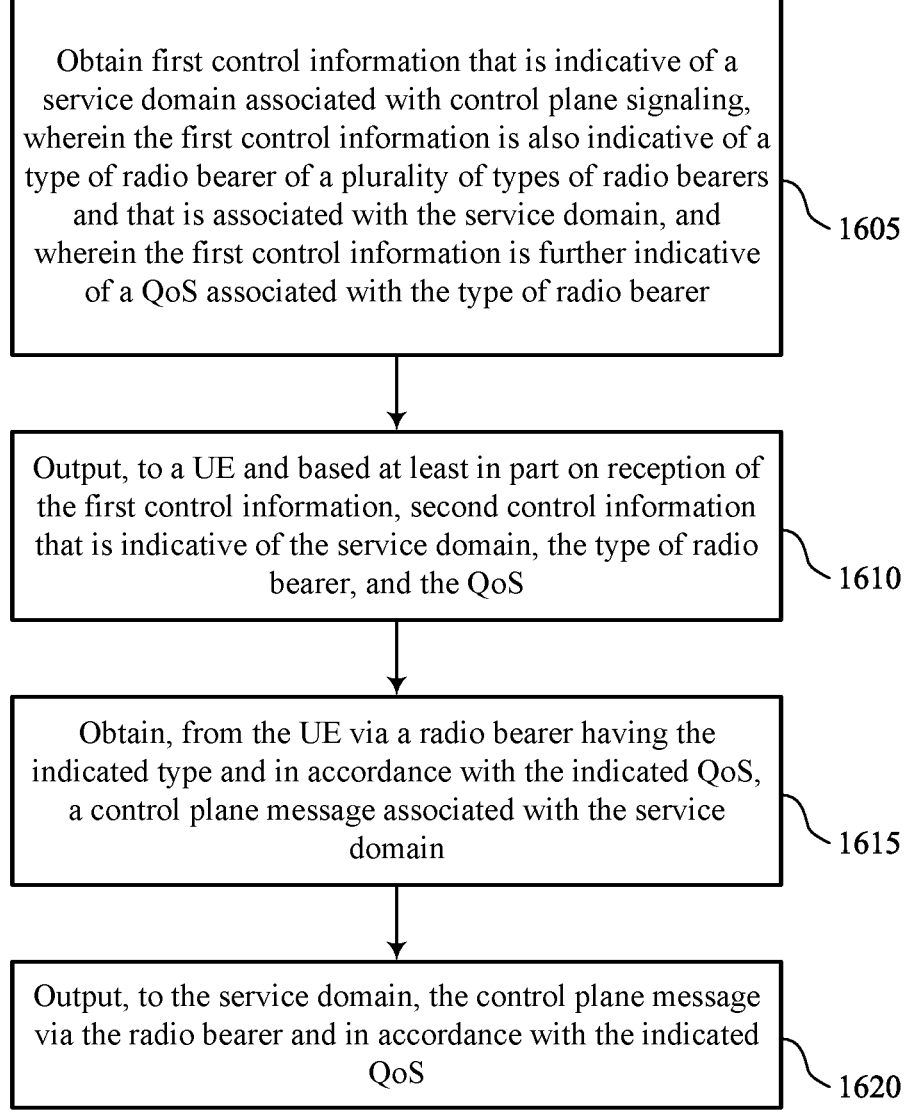

Obtain first control information that is indicative of a service domain associated with control plane signaling, wherein the first control information is also indicative of a type of radio bearer of a plurality of types of radio bearers and that is associated with the service domain, and wherein the first control information is further indicative of a QoS associated with the type of radio bearer

1605

Output, to a UE and based at least in part on reception of the first control information, second control information that is indicative of the service domain, the type of radio bearer, and the QoS

1610

Obtain, from the UE via a radio bearer having the indicated type and in accordance with the indicated QoS, a control plane message associated with the service domain

1615

Output, to the service domain, the control plane message via the radio bearer and in accordance with the indicated QoS

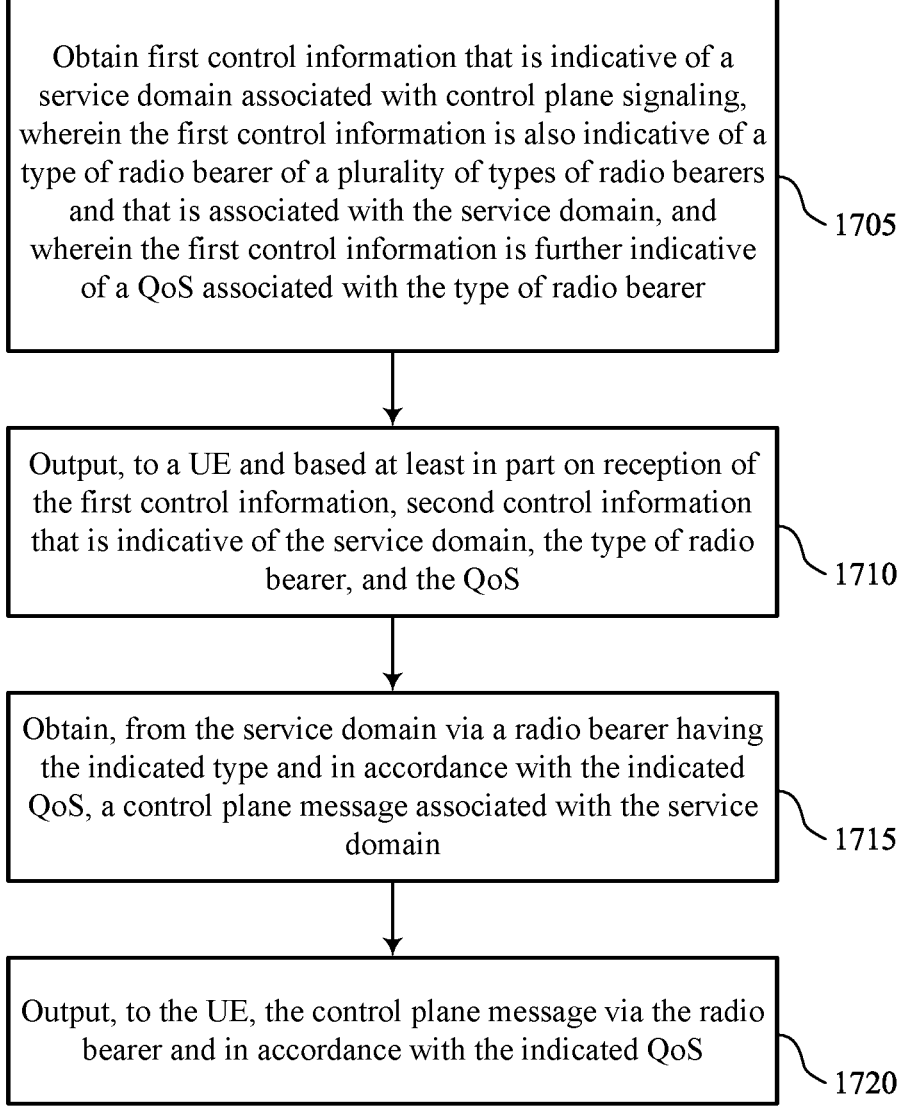

Obtain first control information that is indicative of a service domain associated with control plane signaling, wherein the first control information is also indicative of a type of radio bearer of a plurality of types of radio bearers and that is associated with the service domain, and wherein the first control information is further indicative of a QoS associated with the type of radio bearer

1705

Output, to a UE and based at least in part on reception of the first control information, second control information that is indicative of the service domain, the type of radio bearer, and the QoS

1710

Obtain, from the service domain via a radio bearer having the indicated type and in accordance with the indicated QoS, a control plane message associated with the service domain

1715

Output, to the UE, the control plane message via the radio bearer and in accordance with the indicated QoS

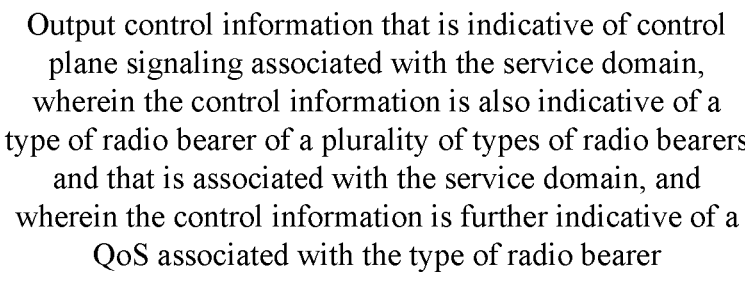

Output control information that is indicative of control plane signaling associated with the service domain, wherein the control information is also indicative of a type of radio bearer of a plurality of types of radio bearers and that is associated with the service domain, and wherein the control information is further indicative of a QoS associated with the type of radio bearer

1805

Communicate, via a radio bearer having the indicated type and in accordance with the indicated QoS, a control plane message associated with the service domain

CONTROL PLANE QUALITY OF SERVICE (QoS) MANAGEMENT

FIELD OF TECHNOLOGY

The following relates to wireless communication, including control plane quality of service (QoS) management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support control plane quality of service (QoS) management. For example, the described techniques provide for enabling management of QoS and other parameters of control plane messages, as well as data plane messages, based on related services, functions, or radio bearers. For example, a wireless network may include a user equipment (UE) that may communicate with one or more service domains, such as via a network entity (e.g., a distributed unit (DU), such as an enhance DU (eDU)). A service domain may indicate control information to the network entity and/or the UE (e.g., via the network entity or directly), where the control information may include a QoS configuration for one or more radio bearers communicated with the service domain. The control information may also include priority, security, and other parameter info that may be related to each service domain according to which signals are communicated via the radio bearers. As such, signaling via radio bearers may be communicated between the UE and service domains in accordance with parameters specific to each service domain, enabling greater granularity in controlling communication parameters for different services.

A method for wireless communication by a UE is described. The method may include receiving control information that is indicative of a service domain associated with control plane signaling, where the control information is also indicative of a type of radio bearer of a set of multiple types of radio bearers and that is associated with the service domain, and where the control information is further indicative of a QoS associated with the type of radio bearer and communicating, via a radio bearer having the indicated type and in accordance with the indicated QoS, a control plane message associated with the service domain.

A UE for wireless communication is described. The UE may include one or more memories storing processor executable code, and one or more processors coupled with the one or more memories. The one or more processors may individually or collectively operable to execute the code to cause the UE to receive control information that is indicative of a service domain associated with control plane signaling, where the control information is also indicative of a type of radio bearer of a set of multiple types of radio bearers and that is associated with the service domain, and where the control information is further indicative of a QoS associated with the type of radio bearer and communicate, via a radio bearer having the indicated type and in accordance with the indicated QoS, a control plane message associated with the service domain.

Another UE for wireless communication is described. The UE may include means for receiving control information that is indicative of a service domain associated with control plane signaling, where the control information is also indicative of a type of radio bearer of a set of multiple types of radio bearers and that is associated with the service domain, and where the control information is further indicative of a QoS associated with the type of radio bearer and means for communicating, via a radio bearer having the indicated type and in accordance with the indicated QoS, a control plane message associated with the service domain.

A non-transitory computer-readable medium storing code for wireless communication is described. The code may include instructions executable by one or more processors to receive control information that is indicative of a service domain associated with control plane signaling, where the control information is also indicative of a type of radio bearer of a set of multiple types of radio bearers and that is associated with the service domain, and where the control information is further indicative of a QoS associated with the type of radio bearer and communicate, via a radio bearer having the indicated type and in accordance with the indicated QoS, a control plane message associated with the service domain.

Some examples of the method, UES, and non-transitory computer-readable medium described herein may further include operations, features, means, or instructions for communicating, via a second radio bearer that may be of a second type of radio bearer of the set of multiple types and that may be associated with the service domain, data associated with the service domain, where the communicating may be in accordance with the indicated QoS.

In some examples of the method, UEs, and non-transitory computer-readable medium described herein, communicating the data may include operations, features, means, or instructions for communicating the data with the service domain via a network entity.

In some examples of the method, UEs, and non-transitory computer-readable medium described herein, receiving the control information may include operations, features, means, or instructions for receiving the control information from a network entity via a radio resource control (RRC) message.

Some examples of the method, UEs, and non-transitory computer-readable medium described herein may further include operations, features, means, or instructions for receiving second control information that may be indicative of a second service domain associated with control plane signaling, where the second control information may be also indicative of a second type of radio bearer of the set of multiple types of radio bearers and that may be associated with the second service domain, and where the second control information may be further indicative of a second QoS associated with the second type of radio bearer and communicating, via a second radio bearer having the indicated second type and in accordance with the indicated second QoS, a second control plane message associated with the second service domain.

In some examples of the method, UEs, and non-transitory computer-readable medium described herein, the control information includes a first identifier associated with the service domain, a second identifier associated with a sub-service domain of the service domain, or a combination thereof.

Some examples of the method, UEs, and non-transitory computer-readable medium described herein may further include operations, features, means, or instructions for multiplexing the radio bearer with a second radio bearer having a second type of radio bearer, where communicating the control plane message includes communicating the control plane message via the multiplexed radio bearer.

In some examples of the method, UEs, and non-transitory computer-readable medium described herein, the indicated type of radio bearer may be different from a second type of radio bearer communicated via RRC signaling.

In some examples of the method, UEs, and non-transitory computer-readable medium described herein, receiving the control information may include operations, features, means, or instructions for receiving the control information from the service domain.

In some examples of the method, UEs, and non-transitory computer-readable medium described herein, the control information indicates a subset of the set of multiple types of radio bearers that may be associated with the service domain and a respective QoS associated with each type of the subset.

In some examples of the method, UEs, and non-transitory computer-readable medium described herein, the control information may be indicative of a level of security associated with the type of radio bearer and communicating the control plane message may be in accordance with the level of security associated with the type of radio bearer.

In some examples of the method, UEs, and non-transitory computer-readable medium described herein, the control information may be indicative of a first priority level associated with the type of radio bearer and communicating the control plane message may be based on the first priority level being higher than a second priority level associated with a second type of radio bearer.

In some examples of the method, UEs, and non-transitory computer-readable medium described herein, communicating the control plane message may include operations, features, means, or instructions for communicating the control plane message with the service domain via a network entity.

In some examples of the method, UEs, and non-transitory computer-readable medium described herein, the service domain includes a service slice of a set of multiple service slices of a core network and associated with a service of a set of multiple services of the core network, a local service slice, a dedicated control service of the core network, or any combination thereof.

In some examples of the method, UEs, and non-transitory computer-readable medium described herein, the control plane message includes a non-access stratum (NAS) message and the service domain may be associated with NAS signaling.

A method for wireless communication by a network entity is described. The method may include obtaining first control information that is indicative of a service domain associated with control plane signaling, where the first control information is also indicative of a type of radio bearer of a set of multiple types of radio bearers and that is associated with the service domain, and where the first control information is further indicative of a QoS associated with the type of radio bearer and outputting, to a UE and based on reception of the first control information, second control information that is indicative of the service domain, the type of radio bearer, and the QoS.

A network entity for wireless communication is described. The network entity may include one or more memories storing processor executable code, and one or more processors coupled with the one or more memories. The one or more processors may individually or collectively operable to execute the code to cause the network entity to obtain first control information that is indicative of a service domain associated with control plane signaling, where the first control information is also indicative of a type of radio bearer of a set of multiple types of radio bearers and that is associated with the service domain, and where the first control information is further indicative of a QoS associated with the type of radio bearer and output, to a UE and based on reception of the first control information, second control information that is indicative of the service domain, the type of radio bearer, and the QoS.

Another network entity for wireless communication is described. The network entity may include means for obtaining first control information that is indicative of a service domain associated with control plane signaling, where the first control information is also indicative of a type of radio bearer of a set of multiple types of radio bearers and that is associated with the service domain, and where the first control information is further indicative of a QoS associated with the type of radio bearer and means for outputting, to a UE and based on reception of the first control information, second control information that is indicative of the service domain, the type of radio bearer, and the QoS.

A non-transitory computer-readable medium storing code for wireless communication is described. The code may include instructions executable by one or more processors to obtain first control information that is indicative of a service domain associated with control plane signaling, where the first control information is also indicative of a type of radio bearer of a set of multiple types of radio bearers and that is associated with the service domain, and where the first control information is further indicative of a QoS associated with the type of radio bearer and output, to a UE and based on reception of the first control information, second control information that is indicative of the service domain, the type of radio bearer, and the QoS.

Some examples of the method, network entities, and non-transitory computer-readable medium described herein may further include operations, features, means, or instructions for obtaining, from the UE via a radio bearer having the indicated type and in accordance with the indicated QoS, a control plane message associated with the service domain and outputting, to the service domain, the control plane message via the radio bearer and in accordance with the indicated QoS.

In some examples of the method, network entities, and non-transitory computer-readable medium described herein, the radio bearer via which the control plane message may be obtained and output may be multiplexed with a second radio bearer having a second type of radio bearer.

In some examples of the method, network entities, and non-transitory computer-readable medium described herein, the control plane message includes a NAS message and the service domain may be associated with NAS signaling.

Some examples of the method, network entities, and non-transitory computer-readable medium described herein may further include operations, features, means, or instructions for obtaining, from the service domain via a radio bearer having the indicated type and in accordance with the indicated QoS, a control plane message associated with the service domain and outputting, to the UE, the control plane message via the radio bearer and in accordance with the indicated QoS.

Some examples of the method, network entities, and non-transitory computer-readable medium described herein may further include operations, features, means, or instructions for communicating, via a second radio bearer that may be of a second type of radio bearer of the set of multiple types and that may be associated with the service domain, data associated with the service domain, where the communicating may be in accordance with the indicated QoS and communicating, via the second radio bearer having the second type of radio bearer, data associated with the UE and in accordance with the indicated QoS; or both.

In some examples of the method, network entities, and non-transitory computer-readable medium described herein, outputting the second control information may include operations, features, means, or instructions for outputting the second control information to the UE via an RRC message.

In some examples of the method, network entities, and non-transitory computer-readable medium described herein, the first control information, the second control information, or both, includes a first identifier associated with the service domain, a second identifier associated with a sub-service domain of the service domain, or a combination thereof.

Some examples of the method, network entities, and non-transitory computer-readable medium described herein may further include operations, features, means, or instructions for obtaining third control information that may be indicative of a second service domain associated with control plane signaling, where the second control information may be also indicative of a second type of radio bearer of the set of multiple types of radio bearers and that may be associated with the second service domain, and where the second control information may be further indicative of a second QoS associated with the second type of radio bearer and outputting, to the UE and based on reception of the third control information, fourth control information that may be indicative of the second service domain, the second type of radio bearer, and the second QoS.

Some examples of the method, network entities, and non-transitory computer-readable medium described herein may further include operations, features, means, or instructions for obtaining, from the UE via a radio bearer having the indicated second type and in accordance with the indicated second QoS, a control plane message associated with the second service domain and outputting, to the second service domain, the control plane message via the second radio bearer and in accordance with the indicated second QoS.

In some examples of the method, network entities, and non-transitory computer-readable medium described herein, the indicated type of radio bearer may be different from a second type of radio bearer associated with RRC.

In some examples of the method, network entities, and non-transitory computer-readable medium described herein, obtaining the first control information may include operations, features, means, or instructions for obtaining the first control information from the service domain.

In some examples of the method, network entities, and non-transitory computer-readable medium described herein, the first control information, the second control information, or both, indicates that the set of multiple types of radio bearers may be associated with the service domain and each of the set of multiple types of radio bearers may be associated with a corresponding QoS.

In some examples of the method, network entities, and non-transitory computer-readable medium described herein, the first control information, the second control information, or both, may be indicative of a level of security associated with the type of radio bearer.

In some examples of the method, network entities, and non-transitory computer-readable medium described herein, the first control information, the second control information, or both, may be indicative of a first priority level associated with the type of radio bearer and the first priority level may be higher than a second priority level associated with a second type of radio bearer.

In some examples of the method, network entities, and non-transitory computer-readable medium described herein, the service domain includes a service slice of a set of multiple service slices of a core network and associated with a service of a set of multiple services of the core network, a local service slice, a dedicated control service of a core network, or any combination thereof.

In some examples of the method, network entities, and non-transitory computer-readable medium described herein, the network entity includes a DU configured to communicate with a core network including the service domain.

A method for wireless communication by a service domain is described. The method may include outputting control information that is indicative of control plane signaling associated with the service domain, where the control information is also indicative of a type of radio bearer of a set of multiple types of radio bearers and that is associated with the service domain, and where the control information is further indicative of a QoS associated with the type of radio bearer and communicating, via a radio bearer having the indicated type and in accordance with the indicated QoS, a control plane message associated with the service domain.

A service domain for wireless communication is described. The service domain may include one or more memories storing processor executable code, and one or more processors coupled with the one or more memories. The one or more processors may individually or collectively operable to execute the code to cause the service domain to output control information that is indicative of control plane signaling associated with the service domain, where the control information is also indicative of a type of radio bearer of a set of multiple types of radio bearers and that is associated with the service domain, and where the control information is further indicative of a QoS associated with the type of radio bearer and communicate, via a radio bearer having the indicated type and in accordance with the indicated QoS, a control plane message associated with the service domain.

Another service domain for wireless communication is described. The service domain may include means for outputting control information that is indicative of control plane signaling associated with the service domain, where the control information is also indicative of a type of radio bearer of a set of multiple types of radio bearers and that is associated with the service domain, and where the control information is further indicative of a QoS associated with the type of radio bearer and means for communicating, via a radio bearer having the indicated type and in accordance with the indicated QoS, a control plane message associated with the service domain.

A non-transitory computer-readable medium storing code for wireless communication is described. The code may include instructions executable by one or more processors to output control information that is indicative of control plane signaling associated with a service domain, where the control information is also indicative of a type of radio bearer of a set of multiple types of radio bearers and that is associated with the service domain, and where the control information is further indicative of a QoS associated with the type of radio bearer and communicate, via a radio bearer having the indicated type and in accordance with the indicated QoS, a control plane message associated with the service domain.

Some examples of the method, service domains, and non-transitory computer-readable medium described herein may further include operations, features, means, or instructions for communicating, via a second radio bearer that may be of a second type of radio bearer of the set of multiple types of radio bearers and that may be associated with the service domain, data associated with a UE and in accordance with the indicated QoS.

In some examples of the method, service domains, and non-transitory computer-readable medium described herein, communicating the data may include operations, features, means, or instructions for communicating the data with the UE via a network entity.

In some examples of the method, service domains, and non-transitory computer-readable medium described herein, the control information includes a first identifier associated with the service domain, a second identifier associated with a sub-service domain of the service domain, or a combination thereof.

Some examples of the method, service domains, and non-transitory computer-readable medium described herein may further include operations, features, means, or instructions for multiplexing the radio bearer with a second radio bearer having a second type of radio bearer, where communicating the control plane message includes communicating the control plane message via the multiplexed radio bearer.

In some examples of the method, service domains, and non-transitory computer-readable medium described herein, the indicated type of radio bearer may be different from a second type of radio bearer associated with RRC.

In some examples of the method, service domains, and non-transitory computer-readable medium described herein, outputting the control information may include operations, features, means, or instructions for outputting the control information to a UE.

In some examples of the method, service domains, and non-transitory computer-readable medium described herein, the control information indicates that the set of multiple types of radio bearers may be associated with the service domain and each of the set of multiple types of radio bearers may be associated with a corresponding QoS.

In some examples of the method, service domains, and non-transitory computer-readable medium described herein, the control information may be indicative of a level of security associated with the type of radio bearer and obtaining the control plane message may be in accordance with the level of security associated with the type of radio bearer.

In some examples of the method, service domains, and non-transitory computer-readable medium described herein, the control information may be indicative of a first priority level associated with the type of radio bearer and communicating the control plane message may be based on the first priority level being higher than a second priority level associated with a second type of radio bearer.

In some examples of the method, service domains, and non-transitory computer-readable medium described herein, communicating the control plane message may include operations, features, means, or instructions for communicating the control plane message with a second network entity.

In some examples of the method, service domains, and non-transitory computer-readable medium described herein, the service domain includes a service slice of a set of multiple service slices of a core network and associated with a service of a set of multiple services of the core network, a local service slice, a dedicated control service of a core network, or any combination thereof.

In some examples of the method, service domains, and non-transitory computer-readable medium described herein, the service domain includes a service domain management function configured to output the control information and obtain the control plane message.

In some examples of the method, service domains, and non-transitory computer-readable medium described herein, the control plane message includes a NAS message and the service domain may be associated with NAS signaling.

BRIEF DESCRIPTION OF THE DRAWINGS

FIGS. 13 through 18 show flowcharts illustrating methods that support control plane QoS management in accordance with one or more aspects of the present disclosure.

DETAILED DESCRIPTION

Figure 1:
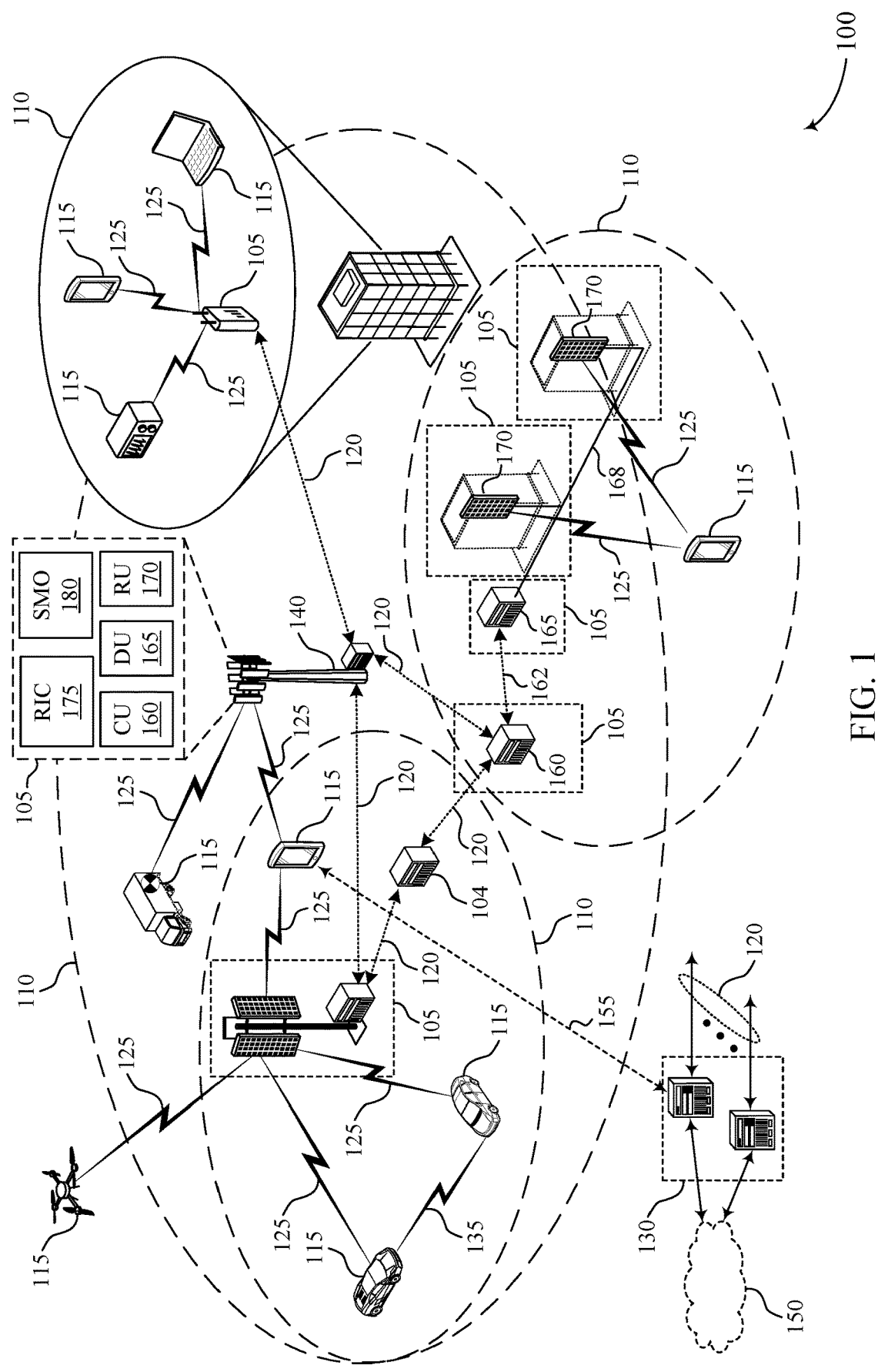
FIG. 1 shows an example of a wireless communications system that supports control plane quality of service (QoS) management in accordance with one or more aspects of the present disclosure.

In some wireless communications systems, a user equipment (UE) may exchange control plane and data plane signaling with one or more services (e.g., service domains) of a core network, including non-access stratum (NAS) signaling. In some system architectures, such signaling exchanged between the services of the core network and the UE may be routed via an access and mobility management function (AMF) of the core network. For example, a UE may transmit NAS signaling messages to an AMF which may relay the signaling messages to intended destination services of the core network, and vice versa. As NAS communications are each routed through the AMF, all NAS signaling messages may be associated with a same quality of service (QoS) and transmitted via a same type of signaling radio bearer (SRB) regardless of the type of service with which the signaling is associated. For example, a service to which or from which a NAS message is communicated may be transparent to the access stratum (AS) layer, where a radio access network (RAN) node associated with the signaling may be aware of the AMF, but not aware of the related service. As such, the NAS message may be communicated using the same QoS, security protocols, priority, among other parameters, regardless of a related type of service. In some system architectures, NAS signaling between services and a UE may not be routed through an AMF, and techniques for differentiation of QoS and other parameters for different services have not yet been explored.

In accordance with examples described herein, network enhancements may be implemented to support QoS differentiation in control plane and other (e.g., data plane) signaling based on a related service. For example, a wireless network may include a UE, a network entity (e.g., a distributed unit (DU), such as an enhanced DU (eDU)), one or more service domains, or a combination thereof. A service domain may indicate to the network entity and/or the UE (e.g., directly or via the network entity) a QoS configuration for radio bearers (e.g., SRBs, data radio bearers (DRBs)) used in communicating with the service domain. Each radio bearer may be associated with a respective QoS according to which control plane messages (e.g., among other types of messages) are communicated, among other parameters such as priority and security protocols. As such, control plane signaling may be communicated between the UE and service domain (e.g., via the network entity) in accordance with corresponding QoSes (e.g., and other parameters).

Utilizing radio bearer-specific QoSes (e.g., other radio bearer-specific or service domain-specific parameters) may support more granular control of control plane communication between service domains and UEs while improving coordination between devices, among other benefits. For example, the QoS according to which a UE communicates control plane and data plane signaling may be tailored to specific service domains and radio access technology (RAT) via which the control plane and data plane signaling is communicated with the service domains.

Aspects of the disclosure are initially described in the context of wireless communications systems. Aspects of the disclosure are further illustrated by and described with reference to networks and process flows that relate to control plane QoS management. Aspects of the disclosure are further illustrated by and described with reference to apparatus diagrams, system diagrams, and flowcharts that relate to control plane QoS management.

FIG. 1 shows an example of a wireless communications system 100 that supports control plane QoS management in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including next generation or future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link, or a satellite connection), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology), a Femto base station. In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support control plane QoS management as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an AMF) and at least one user plane entity that routes packets or interconnects to external networks (e.g., a serving gateway (S-GW), a Packet Data Network (PDN) gateway (P-GW), or a user plane function (UPF)). The control plane entity may manage NAS functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

As discussed herein, network enhancements may be implemented to support QoS differentiation in signaling, such as control plane (e.g., NAS) and data plane signaling, based on a related service. For example, the wireless communication system 100 may include one or more service domains. For instance, the core network 130 may include one or more service domains with which a UE 115 may communicate (e.g., via a network entity 105, such as a DU 165). In some cases, a service domain may represent a service "slice," which may be one of multiple service slices related with similar services or a same service provider. In some cases, a device of a service domain (e.g., a control function) may indicate to one or more network entities 105 and/or one or more UEs 115 (e.g., directly or via a respective network entity 105) a QoS configuration for radio bearers (e.g., SRBs, DRBs) communicated with the service domain. Each radio bearer may be associated with a respective QoS according to which control plane messages (e.g., and data plane messages) may be communicated via the radio bearer. As such, radio bearers may be communicated between the UE 115 and service domain (e.g., via the network entity 105)

in accordance with a corresponding QoS, among other radio bearer-specific or service domain-specific parameters (e.g., security protocols), which may increase power savings as well as enhance signaling reliability, coordination between devices, and improve security of one or more messages, among other benefits.

Figure 2:
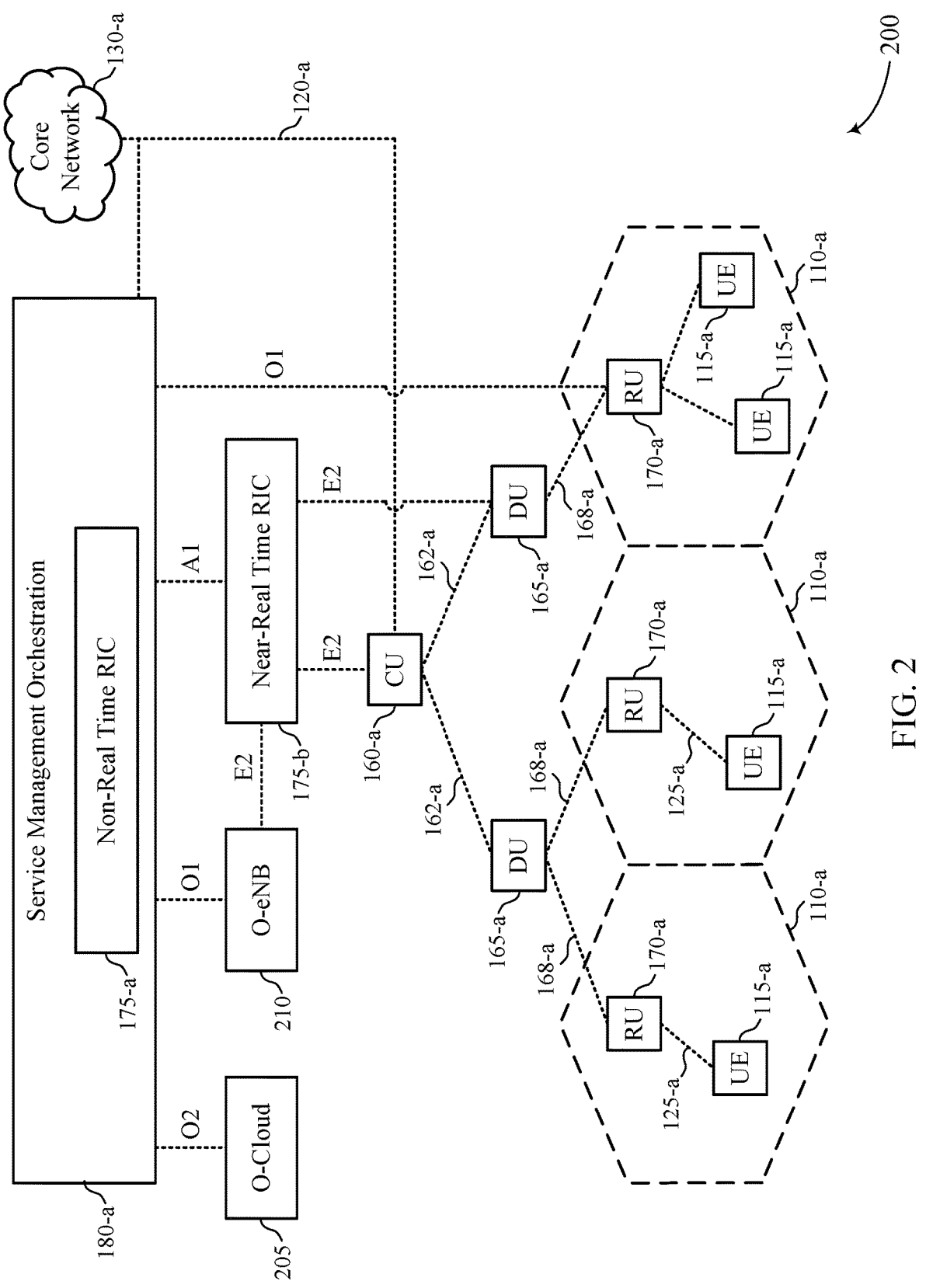
FIG. 2 shows an example of a network architecture that supports control plane QoS management in accordance with one or more aspects of the present disclosure.

FIG. 2 shows an example of a network architecture 200 (e.g., a disaggregated base station architecture, a disaggregated RAN architecture) that supports control plane QoS management in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an A1 interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

As discussed herein, network enhancements may be implemented to support QoS differentiation in signaling, such as NAS signaling, based on a related service. For example, the network architecture 200 may include one or more service domains (e.g., which may each represent a service slice of multiple service slices related with similar services or a same service provider (e.g., of the core network 130-*a*)). Each service domain may have a control function (e.g., a session management function (SMF)). In some cases, a device of a service domain (e.g., a control function) may communicate with one or more network entities (e.g., CUs 160 DUs 165) and one or more UEs 115 (e.g., directly or via any combination of respective CUs 160, DUs 165, or RUs 170-*a*) a QoS configuration for radio bearers (e.g., SRBs,) communicated with the service domain. Each radio bearer may be associated with a respective QoS according to which control plane messages (e.g., and data plane messages) are communicated via the radio bearer. As such, radio bearers may be communicated between the UE(s) 115 and service domain (e.g., via the network entity) in accordance with the corresponding QoS, among other radio bearer-specific or service domain-specific parameters (e.g., security protocols).

Figure 3:
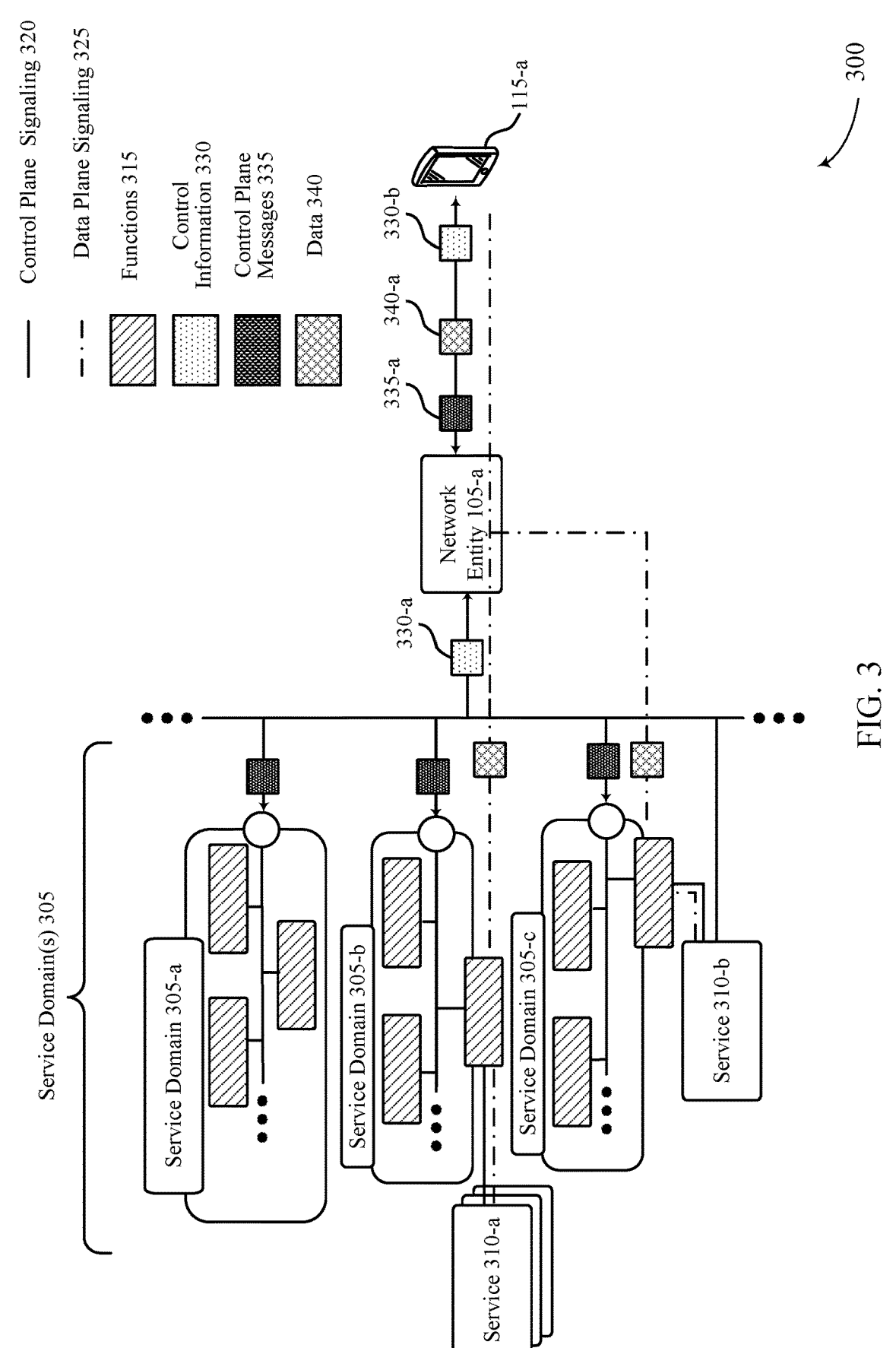
FIG. 3 shows an example of a network that supports control plane QoS management in accordance with one or more aspects of the present disclosure.

FIG. 3 shows an example of a network 300 that supports control plane QoS management in accordance with one or more aspects of the present disclosure. The network 300 may implement or be implemented to realize aspects of the wireless communications system 100 or the network architecture 200. For example, the network 300 may include one or more UEs 115 in communication with one or more network entities 105, which may represent UEs 115 and network entities 105 described with respect to FIGS. 1 and 2. In some examples, the network 300 may support enhancements for control plane QoS management, including QoS differentiation in signaling (e.g., control plane signaling, data plane signaling) based on a related service.

For example, the network 300 may include a UE 115-*a* in communication with a network entity 105-*a* and one or more additional network nodes. In some examples, the UE 115-*a* may communicate messages via a data plane (e.g., user plane) and a control plane. The data plane may manage data communication between the UE 115-*a* and a data network (DN) via the network entity 105-*a*, where the network entity 105-*a* in such an example may be a RAN node of the network 300. Additionally, or alternatively, the control plane may manage control messaging between the UE 115-*a* and a core network. In some cases, the core network (e.g., a core network 130) of the network 300 may include functions related to different services in communication with the UE 115-*a*. For example, the core network may include a session management function (SMF), an AMF, a policy control function (PCF), an application function (AF), a network slice selection function (NSSF), an authentication server function (AUSF), a unified data management (UDM) node, a network slice-specific authentication and authorization function (NSSAA), a network slice admission control function (NSACF), a UPF, a Network Exposure Function (NEF), among other examples of functions and services.

In some cases, an AMF may route signals between a UE 115-*a* and different functions and services of the core network. For example, NAS signaling from different core functions and services of the core network may be routed to the AMF directly to the UE (e.g., using an N1 link) or indirectly to the UE 115-*a* via the network entity 105-*a* (e.g., using an N2 link with a RAN node). Uplink signaling may similarly be routed to the AMF before being transmitted to a destination service. In such examples, the AS layer may use a same radio bearer (e.g., an SRB2) for all NAS signaling, except for some few messages (e.g., initial messages piggybacked with an SRB1). Thus, at any point of time, NAS layer signaling may terminate between a UE and AMF, and may be transparent to the RAN layer (e.g., network entity 105-*a* and the AS layer of the UE 115-*a*). That is, the AS layer of UE 115-*a* and the network entity 105-*a* may not be aware of the contents of the NAS signaling or of a related service or function. In such examples, QoS control for the NAS signaling may be the same regardless of a related service. For example, although there may be different relative priorities of different radio bearers (e.g., different relative priority between SRB2 and SRB1), signaling communicated via the same type radio bearer may be treated similarly regardless of a related service or priority of a related service of the core network (e.g. control signaling for an important video call and for background email downloading may be treated in a same way).

As described herein, the network 300 may evolve to include a distributed architecture which supports enhanced techniques for QoS management based on related services. For example, the network 300 may include one or more services domains (e.g., a service domain 305-*a*, a service domain 305-*b*, and a service domain 305-*c*, among other service domains 305), where each service domain 305 may be an independent modular service with an open application programming interface (API) (e.g., service interface). Each service domain 305 may have control signaling related to a corresponding service 310 (e.g., a data service, application services) for one or more UEs 115 or for multiple services for a UE 115. Each service 310 may in some cases be referred to as an application service, and may be related to data service or other non-data related services, such as location services, sensing services, and accurate timing services, among others. A service domain 305 may also include one or more functions 315, which may be examples of control functions or other functions related to a corresponding service domain 305 and a related service 310.

In the distributed architecture of the network 300, the UE 115-*a* and the network entity 105-*a* may interact (e.g., communicate) directly with each service 310 without going through a central AMF. For example, the UE 115-*a* may transmit or receive, via the network entity 105-*a*, signaling with service domains 305, including control plane signaling 320 (e.g., in uplink and downlink) and data plane signaling 325. In some examples, the control plane signaling 320 may include NAS signaling, such as NAS signaling over hypertext transfer protocol structure (HTTPS), among other mechanisms or protocol structures via which NAS signaling may be carried. Additionally, or alternatively, data plane signaling 325 may include data for one or more services 310 over IP, Ethernet, or unstructured data frames, and may include one or more QoS flows. In some examples, the network entity 105-*a* may be an example of an DU or other network entity, and one or more of the functions 315 may be examples of other network nodes, network entities, or functions. Due to the direct communication, service-specific QoS (e.g., radio bearer-specific QoS) and other service-specific or radio bearer-specific parameters may be applied to signaling from or to each service domain 305 (e.g., service 310).

In some examples, the network 300 may support service-specific resources. For example, the UE 115-*a* may communicate with a respective service domain 305 using one or more different types of radio bearers. For example, the service domain 305-*a* may be an example of a dedicated control service, such as an Access Control Management Services (ACMS), for performing authorization and registration for the UE 115-*a*, and SRBs of type SRB-a may be used for communication with the service domain 305-*a* for the control service. Additionally, or alternatively, an SRB type SRB-b may be used for UE policy control. The network 300 may also include radio bearer types associated with different specific service domains 305, which may in some cases be referred to as service slices, for example, if related to a service 310. For example, an SRB type SRB-c may be used to communicate with the service domain 305-*b* (e.g., a service slice 1), and an SRB type SRB-d may be used to communicate with the service domain 305-*c* (e.g., a service slice 2, or a local service slice). In some cases, the service domain 305-*b* may be an example of a Dedicated Service Slice 1 (DSS1) (e.g. offering voice call service) and the service domain 305-*c* may be an example of a Local Service Slice2 (LSS2) that offers video streaming service.

A service domain 305 may also be associated with multiple different types of radio bearers. For example, one or more types of DRBs, such as a DRB1 and a DRB2, may be used to communicate with the service domain 305-*b* and related service 310-*a* (among other related services), and a DRB3 may be used to communicate with the service domain 305-*c* and related service 310-*b*. Further, SRBs of type SRB-a and SRB-b may both be associated with the service domain 305-*a*. It is noted that the SRB and DRB types described are provided as examples and that each service domain 305 (and related services 310) may be associated with any quantity of types of SRBs and DRBs. Due to the variety of functionality in the different services 310, service-specific radio bearers may enable direct control plane and data plane signaling with corresponding QoSes, priorities, and securities, among other parameters.

In some examples, each radio bearer (e.g., NAS SRB) related to the service domains 305 may be managed together with corresponding DRBs and a corresponding QoS. For example, the SRB-c type may be used for control plane signaling 320 for the service domain 305-*b*, and DRB1 and DRB2 may be used for data plane signaling 325 for the service domain 305-*b*. In some examples, each of the radio bearers for both the control plane and data plane signaling with the service domain 305-*b* (e.g., SRB-c, DRB1, DRB2) may be communicated according to a same QoS configuration. In some other examples, one or more of the radio bearers may be communicated according to a different QoS configuration. Similarly, the SRB-d and DRB3 may be communicated according to a QoS related to the service domain 305-*c* that is different than a QoS of radio bearers communicated with the service domain 305-*b*.

In some cases, radio bearers associated with a same service domain 305 may share the same security protections. For example, SRBs and DRBs related to one service domain 305 may be communicated according to first security protocols, while SRBs and DRBs related to another service domain 305 may be communicated according to second security protocols. In an example, SRBs and DRBs related to a first service domain 305 may include integrity protection and encryption, among other security policies, while SRBs and DRBs related to a second service domain 305 may turn off integrity protection or may turn off encryption (e.g., for a less secure or less critical service).

In some examples, SRBs and DRBs associated with a same service domain 305 or service 310 may be associated with a same priority, while SRBs and DRBs associated with different service domains 305 may have different priorities. For example, the SRB-c associated with the service domain 305-*b* may have a lower priority than the SRB-a associated with the service domain 305-*a*. In some cases, radio bearers may include additional granularity in one or more parameters that are not the same for a single service domain 305. For example, the SRB-a and SRB-b may both be related to the service domain 305-*a*, but may have different priorities (e.g., SRB-a is related to emergency services, or multimedia priority services).

In some examples, the network 300 may include signaling enhancements for configuring service-specific parameters. For example, depending on a related service 310 and service domain 305 (e.g., an ACMS, DSS 1, etc.), a domain policy engine (e.g., represented by a function 315) of a service domain 305 may provide control plane signaling and/or data plane signaling configurations. For example, a function 315 of a service domain 305 may be an example of a service domain management function, which may perform signaling and other communications for an associated service domain 305 and service or services 310. Further, a service domain management function or other function 315 may in some cases be referred to as a network entity or network node of the network 300. Thus, the network entity 105-*a*, UE 115-*a*, or other devices may manage and assign related QoS, security, priority, or other parameters to radio bearers for control plane and data plane messaging, supporting a more flexible radio bearer model for communication of control plane signaling and data plane signaling.

For example, signaling enhancements may include signaling between service domains 305 and related network entities 105, such as DUs. For example, the service domain 305-*b* may output (e.g., via a function 315) control information 330-*a* to the network entity 105-*a*. The control information 330-*a* may indicate radio bearer and QoS information that is specific to the service domain 305-*b*. For example, the control information 330-*a* may indicate that the SRB type SRB-c, the DRB type DRB1 and the DRB type DRB2 are associated with (e.g., may be used to communicated with) the service domain 305-*b*. The control information 330-*a* may also indicate a respective QoS associated with each type of radio bearer (e.g., each of SRB-C, DRB1, and DRB2). For example, the UE 115-*a* may communicate a given type of radio bearer with the service domain 305-*b* according to the corresponding QoS indicated by the control information 330-*a*. In some examples, the control information 330-*a* may indicate a single QoS, and each type of radio bearer indicated by the control information 330-*a* may be associated with the QoS.

In some examples, control information 330 may indicate security information, priority information, or a combination thereof, associated with a corresponding service domain 305 (e.g., radio bearers used to communicated with the service domain 305). For example, the control information 330-*a* may indicate one or more levels of security (e.g., security protocols) associated with the radio bearers for communicating with the service domain 305-*b* (e.g., a respective level of security per radio bearer, a level of security common to the radio bearers), and the radio bearers may be communicated between the UE 115-*a* and the service domain 305-*b* in accordance with the one or more levels of security. Additionally, or alternatively, the control information 330-*a* may indicate one or more priorities associated with the radio bearers for communicating with the service domain 305-*b* (e.g., a respective priority per radio bearer, a priority common to the radio bearers), and the radio bearers may be communicated between the UE 115-*a* and the service domain 305-*b* in accordance with the one or more priorities. In another example, the control information 330-*a* may indicate relative QoS ratio configurations for the control plane signaling, user plane services, and securities configuration. In that manner, the control information 330-*a* may indicate an explicit QoS configuration for the control plane signaling, and the QoS for the corresponding user plane services may be derived. For example, a 25 ms explicitly indicated control signaling packet delay budget may correspond to a 50 ms end to end user plane data packet delay budget, or vice versa.

In some cases, control plane (e.g., NAS) signaling may indicate QoS information (e.g., a QoS profile) related to itself. For example, control plane signaling from the service domain 305-*b* to the network entity 105-*a* (e.g., or the UE 115-*a*) may include the control information 330-*a*. In some cases, the control information 330-*a* may include a QoS identifier (e.g., a QoS index (QI)) indicating the QoS. In some examples, a service domain 305 may provide (e.g., output) control information 330 directly to a UE 115.

In some examples, SRBs and related QoS and other parameters may be configured at the AS level. For example, the network entity 105-*a* (e.g., eDU) may provide control information 330-*b* to the UE 115-*a*, which may indicate the QoS information, security policies, priority information, and radio bearers (e.g., radio bearer types) for the service domain 305-*b* and service 310-*a* as indicated in the control information 330-*a*. In some examples, such parameters and radio bearers may be included in an SRB configuration transmitted to the UE 115-*a* at AS layer. For example, the network entity 105-*a* may send (e.g., output) RRC signaling including an RRC configuration (e.g., a configuration defined by RRCReconfig ( . . . RadioBearerConfig)). The RRC configuration may indicate a respective SRB configuration for one or more SRBs that indicates corresponding QoSes for the one or more SRBs (e.g., may include a SRB-ToAdd-Mode parameter including an SRB-QoS-Config parameter that indicates a QoS configuration for each related SRB of the control information 330-*b*).

The RRC configuration may also indicate specific service domains or services related to each SRB configuration. For example, the SRB-QoS-Config parameter may include one or more Service ID variables, where a Service ID may indicate a mapping for a control plane message (e.g., a NAS message) of a particular service to a corresponding SRB. For example, the Service ID variable may indicate the service 310-*a* of the service domain 305-*b* and, as such, may indicate that the SRB of the SRB configuration is for communicating with the service 310-*a*. In some examples, the SRB-QoS-Config may include a finer granularity of sub-services for a control plane message. For example, the SRB-QoS-Config parameter may include one or more Sub-service ID variables, where each Sub-service ID may correspond to a specific service slice and service. For example, the service 310-*a* and the service domain 305-*b* may represent a service slice of a plurality of service slices related to a specific type of service. For example, the Service ID may indicate a group or type of service as video streaming services, where the Sub-service ID may indicate the service domain 305-*b* and service 310-*a*, which may correspond to a video streaming platform or application (e.g., of a company or brand). By way of another example, the service domain 305-*b* may be related to multiple video streaming services, where the Sub-Service ID may indicate a specific sub-service, such as the service 310-*a*. The UE 115-*a* may make use of the Service ID and the Sub-service ID to determine which SRB to use in a particular control signaling message associated with a service.

The UE 115-*a* may utilize the control information 330-*b* and related configurations in communicating with corresponding service domains 305 or services 310. For example, the UE 115-*a* may assign an SRB of the SRB-a type to a control plane message 335-*a* (e.g., a NAS signal) intended for transmission to the service domain 305-*b* based on receiving the control information 330-*b* (e.g., in an RRC including an SRB-QoS-Config), and may transmit the control plane message 335-*a* in accordance with the configured parameters. For example, the UE 115-*a* may transmit the control plane message 335-*a* to the network entity 105-*a* via the SRB of the SRB-a type and in accordance with a configured Service ID or Sub-service ID, using the associated security policies, priority, and/or QoS parameters, and the network entity 105-*a* may relay (e.g., output) the control plane message 335-*a* to the service domain 305-*b* via a control plane signaling connection established with the service domain 305-*b* based on the control information 330-*a* and 330-*b*. By way of another example, the UE 115-*a* may transmit the control plane message 335-*a* directly to the service domain 305-*b*. Additionally, or alternatively, the service domain 305-*b* may output a control plane message 335-*a* to the network entity 105-*a* via a control plane signaling connection established with the network entity 105-*a* based on the control information 330-*a* and 330-*b* in accordance with the configured security policies, priority, and/or QoS parameters, and the network entity 105-*a* may relay (e.g., output) the control plane message 335-*a* to the UE 115-*a* via the SRB of the SRB-a type and in accordance with the same parameters. In some other examples, the service domain 305-*b* may transmit the control plane message 335-*a* directly to the UE 115-*a*.

The UE 115-*a* may also communicate (e.g., may transmit, or may receive) data 340-*a* associated with the service domain 305-*b* in accordance with a corresponding QoS parameter or other configured parameters. For example, the UE 115-*a* may communicate the data 340-*a* with the service domain 305-*b* via the network entity 105-*a*, or may communicate the data 340-*a* directly with the service domain 305-*b*, in accordance with the configured security policies, priority, and/or QoS parameters.

The network 300 may support communication of a type of control radio bearer that is not an SRB. For example, control plane signaling may be sent in a message via a control radio bearer different from an RRC message. This may be supported based on a RAT used for the UE 115-*a* to access the network 300. For example, such signaling may be via a control channel of a Wireless Local Area Network technology (e.g. WiFi, Extensible Authentication Protocol (EAP) method, Internet Key Exchange (IKE) or IP Security (IPSec) channel).

The network 300 may also support multiplexing radio bearers. Control plane and data plane message may also be multiplexed. For example, a service domain 305, network entity 105, or UE 115 may multiplex SRBs for control plane (e.g., NAS) messages with DRBs for data traffic or with other SRBs. Such multiplexing may be performed based on service labels for each radio bearer, where aggregation may be enabled at different layers, such as in medium access control (MAC) Logical Channel Prioritization (LCP), SDAP bearer mapping). For example, each radio bearer may be associated with (e.g., include) a service label indicating the type of traffic carried by the radio bearer, which may enable the radio bearers to be multiplexed while distinguishing respective traffic from each other.

Figure 4:
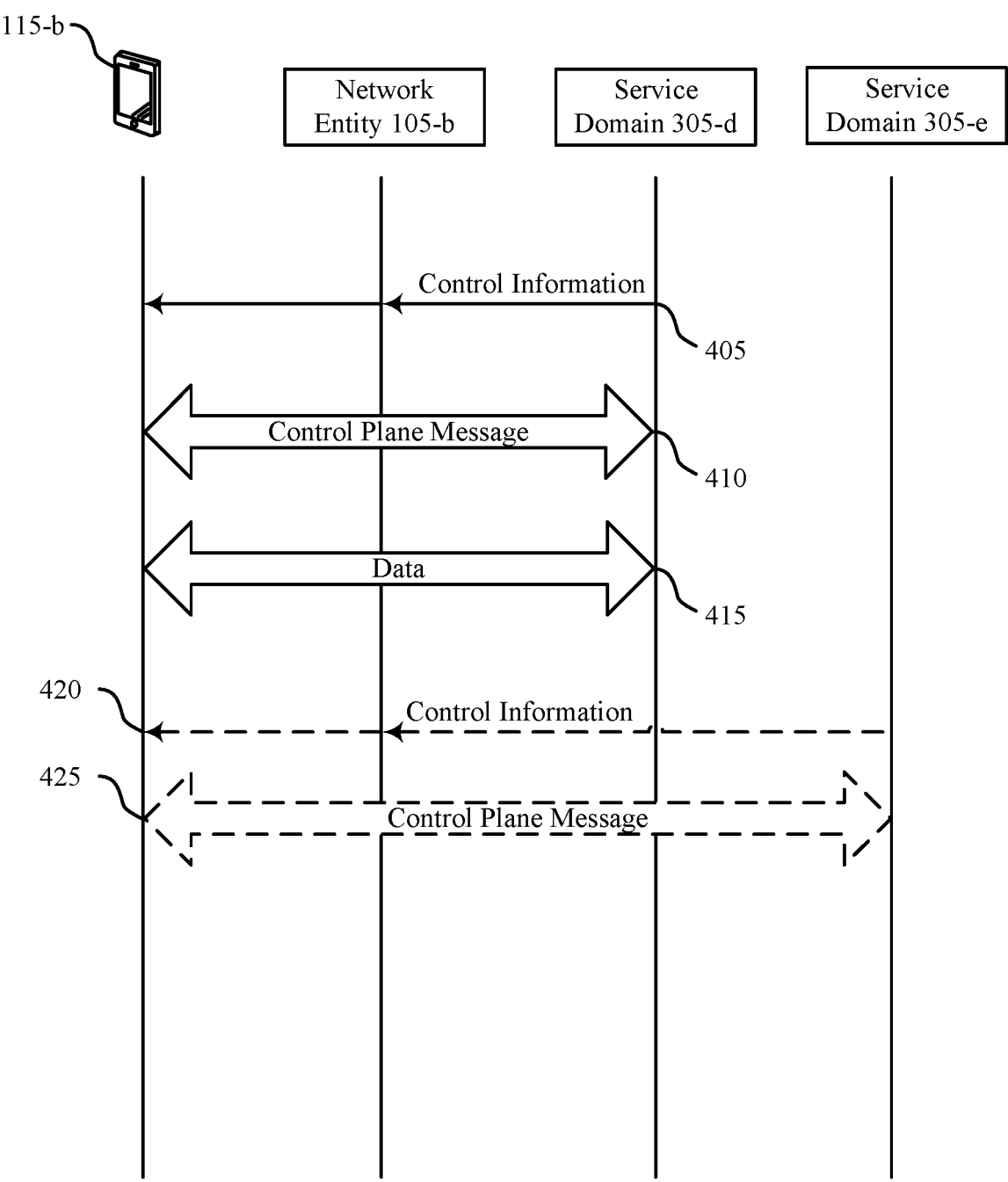
FIG. 4 shows an example of a process flow that supports control plane QoS management in accordance with one or more aspects of the present disclosure.

FIG. 4 shows an example of a process flow 400 that supports control plane QoS management in accordance with one or more aspects of the present disclosure. The process flow 400 may implement or be implemented to realize aspects of the wireless communications system 100, the network architecture 200, and the network 300. For example, the process flow 400 may be implemented by a UE 115-b, a network entity 105-b, and one or more service domains 305, which may be examples of the corresponding devices described herein, including with reference to FIGS. 1-3.

In the following description of the process flow 400, the operations may be performed (such as reported or provided) in a different order than the order shown, or the operations performed by the example devices may be performed in different orders or at different times. Some operations also may be omitted from the process flow 400, or other operations may be added to the process flow 400. Further, although some operations or signaling may be shown to occur at different times for discussion purposes, these operations may actually occur at the same time or otherwise concurrently.

At 405, the service domain 305-d may output first control information. For example, the service domain 305-d may output control information that is indicative of (e.g., identifies) the service domain. The control information may also indicate a type of radio bearer of a set of multiple types of radio bearers and that is associated with the service domain, and may further indicate a QoS associated with the type of radio bearer. In another alternative, the service domain 305-d may provide the control information as QoS flows instead of radio bearers. The network entity 105-b and the AS layer of the UE 115-b may map corresponding control information from QoS flows to radio bearers based on a local configuration and RAT relevance.

In some examples, the UE 115-a and the service domain 305-d may communicate the control information via the network entity 105-b. For example, the service domain 305-d may provide (e.g., output, transmit) a first control information to the network entity 105-b, and the network entity 105-b may send (e.g., output, transmit) a second control information to the UE 115-b that is indicative of the service domain, the type of radio bearer, and the QoS based on the reception of the first control information (e.g., the network entity 105-b may adapt and forward the first control information to the UE 115-b). In some examples, the second control information may be received via an RRC message. Additionally, or alternatively, the UE 115-a may receive the control information directly from the service domain 305-d (e.g., via NAS layer signaling). The indicated type of radio bearer may also be different from a second type of radio bearer communicated via RRC signaling. That is, the UE 115-a may receive the control information via signaling other than RRC signaling (e.g., using a default radio bearer).

In some examples, the control information may include a first identifier associated with the service domain (e.g., a Service ID), a second identifier associated with a sub-service domain of the service domain (e.g., a Sub-service ID), or a combination thereof. In some examples, the sub-service domain may be an example of a service slice associated with a particular type of service identified by the first identifier.

Additionally, or alternatively, the control information may indicate multiple types of radio bearers associated with the service domain and a respective QoS associated with each of the types of radio bearers. For example, the control information may indicate a subset of the set of multiple types of radio bearers and a respective QoS associated with each type of the subset. The control information may also indicate of a level of security associated with the type of radio bearer, a first priority level associated with the type of radio bearer, or both. In some examples, the first priority level may be higher than a second priority level associated with a second type of radio bearer. The control information may also indicate that the set of multiple types of radio bearers are associated with the service domain and with a corresponding QoS.

At 410, the UE 115-b and the network entity 105-b, the service domain 305-d, or any combination thereof, may communicate, via a radio bearer having the indicated type and in accordance with the indicated QoS, a control plane message associated with the service domain. In some cases, the control plane message may be communicated in accordance with the level of security associated with the type of radio bearer. In some examples, communicating the control plane message may be based on the first priority level being higher than a second priority level associated with a second type of radio bearer.

In some examples, the control plane message may be communicated between the UE 115-a and the service domain 305-d via the network entity 105-b. For example, the UE 115-a may transmit, and the network entity 105-b may obtain from the UE 115-a via a radio bearer having the indicated type and in accordance with the indicated QoS, a control plane message associated with the service domain. The network entity 105-b may then output, to the service domain 305-d, the control plane message via the control plane connection and in accordance with the indicated QoS. Additionally, or alternatively, the network entity 105-b may obtain, from the service domain 305-d via a control plane connection (e.g., via the radio bearer having the indicated type) and in accordance with the indicated QoS, a control plane message associated with the service domain. The network entity 105-b may also transmit (e.g., output) the control plane message to the UE 115-b via the radio bearer and in accordance with the indicated QoS. Additionally, or alternatively, the control plane message may be communicated directly between the UE 115-b and the service domain 305-d.

In some examples, the radio bearer may be multiplexed with a second radio bearer having a second type of radio bearer, where communicating the control plane message may include communicating the control plane message via the multiplexed radio bearer. For example, the UE 115-b may multiplex the radio bearer with a second type of radio bearer (e.g., a DRB) and transmit the multiplexed radio bearer to the network entity 105-b (e.g., which may further forward the messages to the service domain 305-d). Additionally, or alternatively, the service domain 305-d may multiplex the control plane signaling with the user plane data, and indicate both to the network entity 105-b, which may then multiplex the corresponding radio bearer with a second type of radio bearer (e.g., a DRB) and transmit the multiplexed radio bearer to the UE 115-b. The control plane message may in some examples be a NAS message and the service domain may be associated with NAS signaling.

At 415, the UE 115-*b* and the network entity 105-*b*, the service domain 305-*d*, or any combination thereof, may communicate, via a second radio bearer that is of a second type of radio bearer of the set of multiple types and that is associated with the service domain, data associated with the service domain in accordance with the indicated QoS. In some examples, the data may be communicated between the UE 115-*b* and the service domain 305-*d* via the network entity 105-*b*, or directly between the UE 115-*b* and the service domain 305-*d*. For example, the network entity 105-*b* may be configured to communicate data associated with the service domain 305-*d*, associated with the UE 115-*b*, or both. Additionally, or alternatively, the data may be communicated directly between the UE 115-*b* and the service domain 305-*d*.

At 420, the UE 115-*b* may receive additional control information (e.g., third control information) associated with a second service domain 305-*e*. For example, the UE 115-*b* may receive, either directly from (e.g., as third control information) the second service domain or via the network entity 105-*b* (e.g., as fourth control information output by the network entity 105-*b* after the network entity 105-*b* obtains third control information from the second service domain 305-*e*), additional control information that is indicative of a second service domain associated with control plane signaling. The second control information may also indicate a second type of radio bearer of the set of multiple types of radio bearers and that is associated with the second service domain 305-*e* and a second QoS associated with the second type of radio bearer.

At 425, the UE 115-*b* may communicate, via the second radio bearer having the indicated second type associated with the second service domain 305-*e*, and in accordance with the indicated second QoS, a second control plane message associated with the second service domain 305-*e*. In some examples, the network entity 105-*b* may obtain, from the UE via a radio bearer having the indicated second type and in accordance with the indicated second QoS, a control plane message associated with the second service domain. The network entity 105-*b* may forward (e.g., output), to the second service domain 305-*e*, the control plane message via the control plane connection (e.g., via the second radio bearer) in accordance with the indicated second QoS. Additionally, or alternatively, the network entity 105-*b* may obtain a control plane message from the second service domain 305-*e* and output the control plane message to the UE 115-*b*. The UE 115-*b* and the second service domain 305-*e* may in some cases communicate the control plane message directly.

In some examples, the service domain 305-*d* (or the service domain 305-*e*) may be a service slice of a set of multiple service slices of a core network and may be associated with a service of a set of multiple services of the core network, a local service slice, a dedicated control service of the core network, or any combination thereof. Additionally, or alternatively, the service domain 305-*d* may be a service domain management function configured to output the control information and obtain the control plane message. Additionally, or alternatively, the network entity 105-*b* may be a DU (e.g., an eDU) configured to communicate with a core network including the service domain 305-*d* (or service domain 305-*e*).

Figure 5:
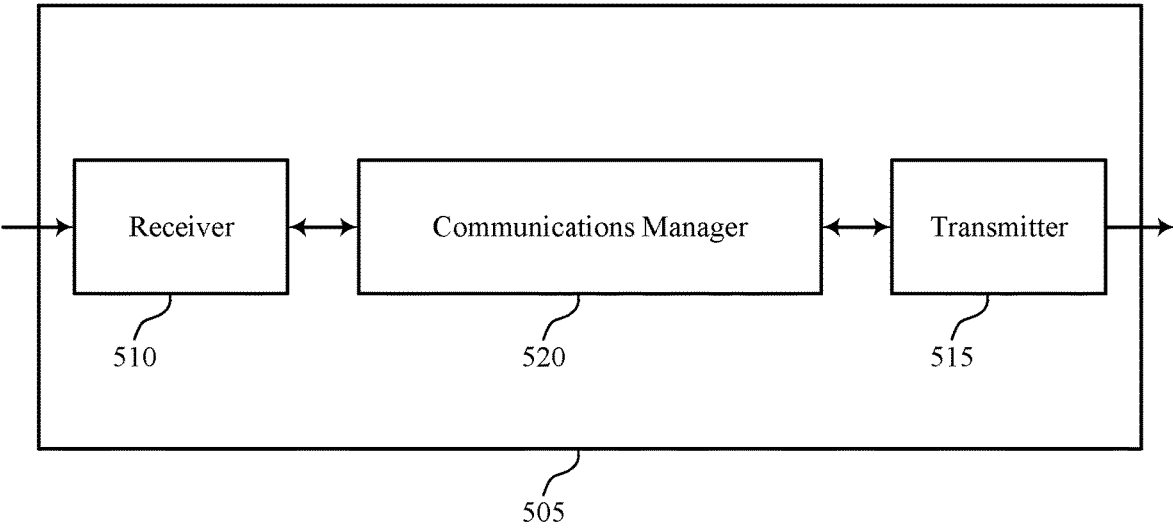
FIGS. 5 and 6 show block diagrams of devices that support control plane QoS management in accordance with one or more aspects of the present disclosure.

FIG. 5 shows a block diagram 500 of a device 505 that supports control plane QoS management in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to control plane QoS management). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to control plane QoS management). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of control plane QoS management as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for receiving control information that is indicative of a service domain associated with control plane signaling, where the control information is also indicative of a type of radio bearer of a set of multiple types of radio bearers and that is associated with the service domain, and where the control information is further indicative of a QoS associated with the type of radio bearer. The communications manager 520 is capable of, configured to, or operable to support a means for communicating, via a radio bearer having the indicated type and in accordance with the indicated QoS, a control plane message associated with the service domain.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for more efficient utilization of communication resources and reduced power consumption by enabling variability and more granular control in message QoS, security, and priority based on related services.

Figure 6:
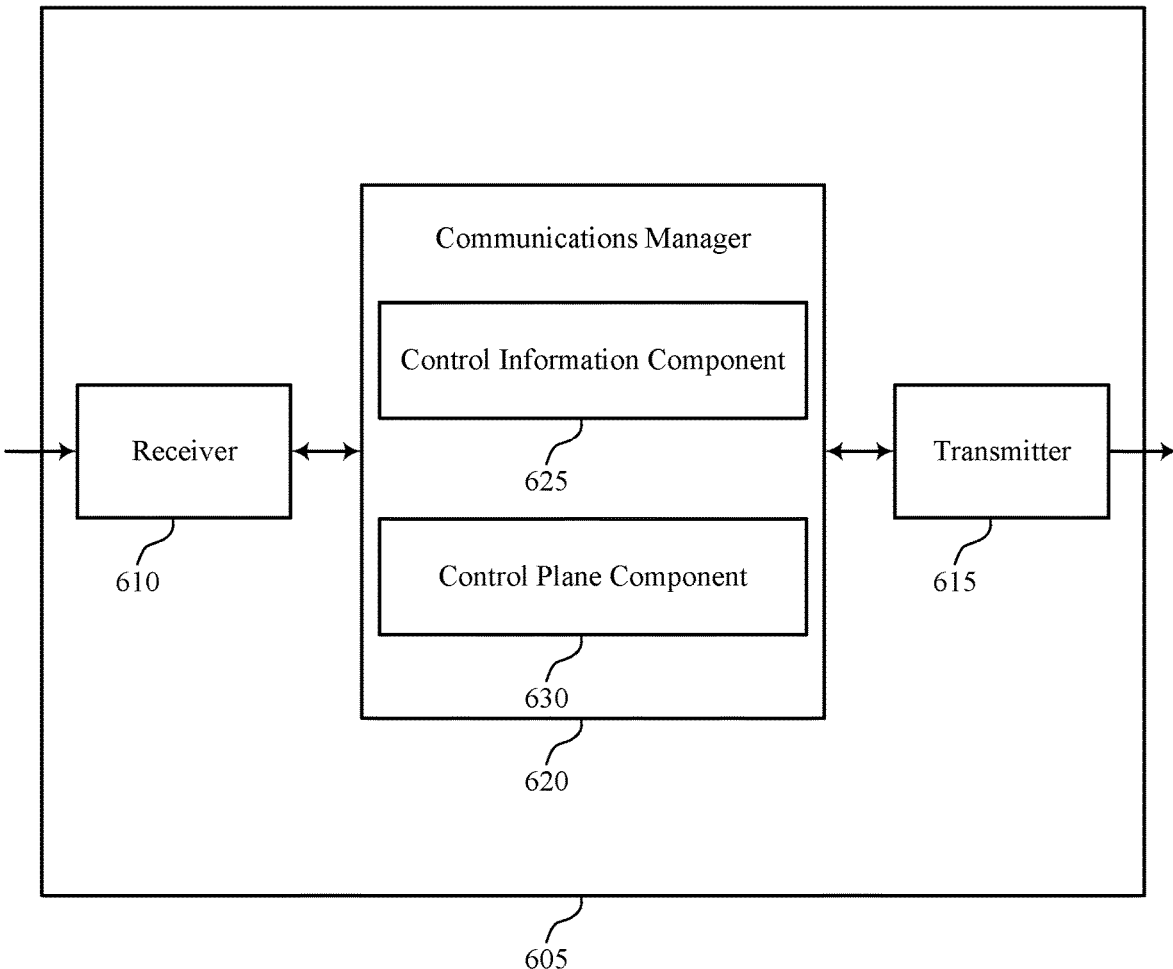

FIG. 6 shows a block diagram 600 of a device 605 that supports control plane QoS management in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to control plane QoS management). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to control plane QoS management). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of control plane QoS management as described herein. For example, the communications manager 620 may include a control information component 625 a control plane component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The control information component 625 is capable of, configured to, or operable to support a means for receiving control information that is indicative of a service domain associated with control plane signaling, where the control information is also indicative of a type of radio bearer of a set of multiple types of radio bearers and that is associated with the service domain, and where the control information is further indicative of a QoS associated with the type of radio bearer. The control plane component 630 is capable of, configured to, or operable to support a means for communicating, via a radio bearer having the indicated type and in accordance with the indicated QoS, a control plane message associated with the service domain.

Figure 7:
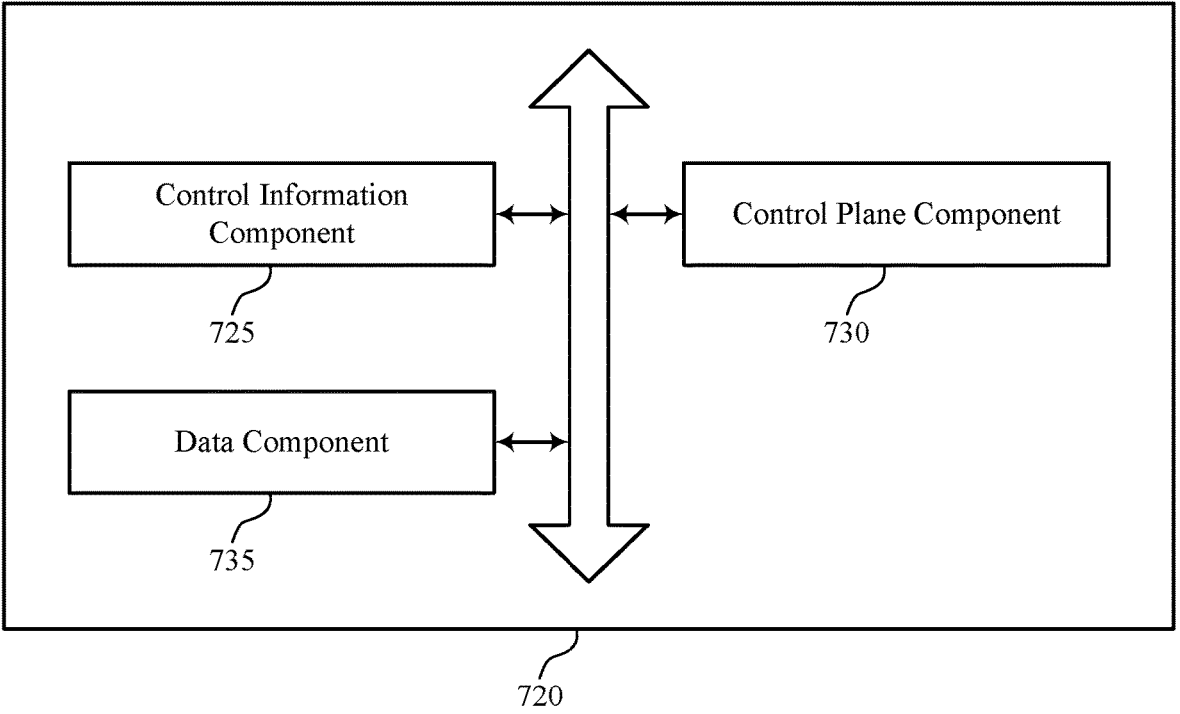
FIG. 7 shows a block diagram of a communications manager that supports control plane QoS management in accordance with one or more aspects of the present disclosure.

FIG. 7 shows a block diagram 700 of a communications manager 720 that supports control plane QoS management in accordance with one or more aspects of the present disclosure. The communications manager 720 may be an example of aspects of a communications manager 520, a communications manager 620, or both, as described herein. The communications manager 720, or various components thereof, may be an example of means for performing various aspects of control plane QoS management as described herein. For example, the communications manager 720 may include a control information component 725, a control plane component 730, a data component 735, or any combination thereof. Each of these components, or components or subcomponents thereof (e.g., one or more processors, one or more memories), may communicate, directly or indirectly, with one another (e.g., via one or more buses).

The communications manager 720 may support wireless communication in accordance with examples as disclosed herein. The control information component 725 is capable of, configured to, or operable to support a means for receiving control information that is indicative of a service domain associated with control plane signaling, where the control information is also indicative of a type of radio bearer of a set of multiple types of radio bearers and that is associated with the service domain, and where the control information is further indicative of a QoS associated with the type of radio bearer. The control plane component 730 is capable of, configured to, or operable to support a means for communicating, via a radio bearer having the indicated type and in accordance with the indicated QoS, a control plane message associated with the service domain.

In some examples, the data component 735 is capable of, configured to, or operable to support a means for communicating, via a second radio bearer that is of a second type of radio bearer of the set of multiple types and that is associated with the service domain, data associated with the service domain, where the communicating is in accordance with the indicated QoS.

In some examples, to support communicating the data, the data component 735 is capable of, configured to, or operable to support a means for communicating the data with the service domain via a network entity.

In some examples, to support receiving the control information, the control information component 725 is capable of, configured to, or operable to support a means for receiving the control information from a network entity via an RRC message.

In some examples, the control information component 725 is capable of, configured to, or operable to support a means for receiving second control information that is indicative of a second service domain associated with control plane signaling, where the second control information is also indicative of a second type of radio bearer of the set of multiple types of radio bearers and that is associated with the second service domain, and where the second control information is further indicative of a second QoS associated with the second type of radio bearer. In some examples, the control plane component 730 is capable of, configured to, or operable to support a means for communicating, via a second radio bearer having the indicated second type and in accordance with the indicated second QoS, a second control plane message associated with the second service domain.

In some examples, the control information includes a first identifier associated with the service domain, a second identifier associated with a sub-service domain of the service domain, or a combination thereof.

In some examples, the control plane component 730 is capable of, configured to, or operable to support a means for multiplexing the radio bearer with a second radio bearer having a second type of radio bearer, where communicating the control plane message includes communicating the control plane message via the multiplexed radio bearer.

In some examples, the indicated type of radio bearer is different from a second type of radio bearer communicated via RRC signaling.

In some examples, to support receiving the control information, the control information component 725 is capable of, configured to, or operable to support a means for receiving the control information from the service domain.

In some examples, the control information indicates a subset of the set of multiple types of radio bearers that are associated with the service domain and a respective QoS associated with each type of the subset. In some examples, the control information is indicative of a level of security associated with the type of radio bearer. In some examples, communicating the control plane message is in accordance with the level of security associated with the type of radio bearer. In some examples, the control information is indicative of a first priority level associated with the type of radio bearer. In some examples, communicating the control plane message is based on the first priority level being higher than a second priority level associated with a second type of radio bearer.

In some examples, to support communicating the control plane message, the control plane component 730 is capable of, configured to, or operable to support a means for communicating the control plane message with the service domain via a network entity.

In some examples, the service domain includes a service slice of a set of multiple service slices of a core network and associated with a service of a set of multiple services of the core network, a local service slice, a dedicated control service of the core network, or any combination thereof. In some examples, the control plane message includes a NAS message. In some examples, the service domain is associated with NAS signaling.

Figure 8:
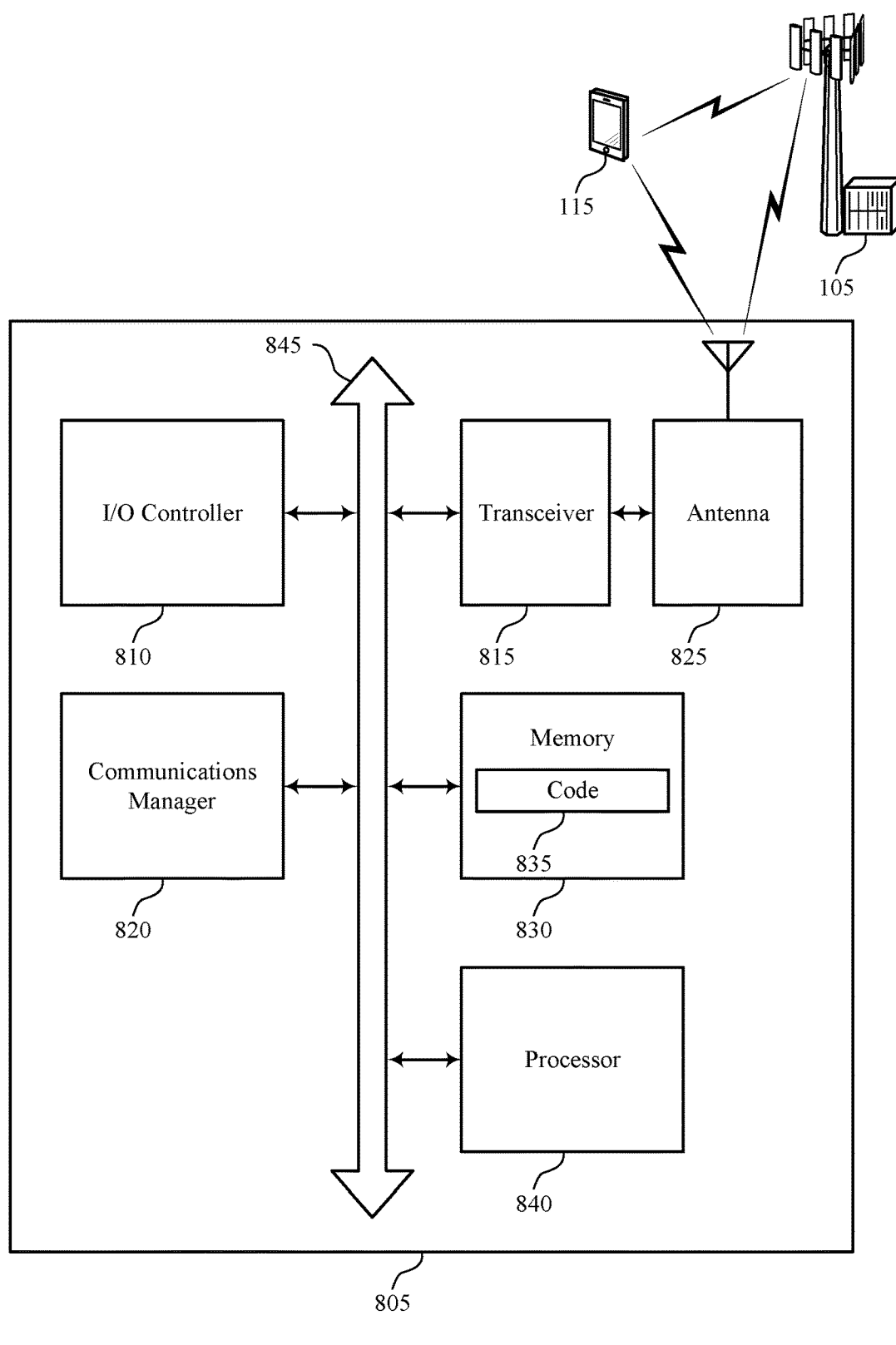
FIG. 8 shows a diagram of a system including a device that supports control plane QoS management in accordance with one or more aspects of the present disclosure.

FIG. 8 shows a diagram of a system 800 including a device 805 that supports control plane QoS management in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting control plane QoS management). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communication in accordance with examples as disclosed herein. For example, the communications manager 820 is capable of, configured to, or operable to support a means for receiving control information that is indicative of a service domain associated with control plane signaling, where the control information is also indicative of a type of radio bearer of a set of multiple types of radio bearers and that is associated with the service domain, and where the control information is further indicative of a QoS associated with the type of radio bearer. The communications manager 820 is capable of, configured to, or operable to support a means for communicating, via a radio bearer having the indicated type and in accordance with the indicated QoS, a control plane message associated with the service domain.

By including or configuring the communications manager 820 in accordance with examples as described herein, the device 805 may support techniques for more efficient utilization of communication resources, reduced power consumption, improved coordination between devices, improved reliability, and increase security in signaling by enabling variability and more granular control in signal QoS, security, and priority based on related services.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of control plane QoS management as described herein, or the at least one processor 840 and the at least one memory 830 may be otherwise configured to, individually or collectively, perform or support such operations.

Figure 9:
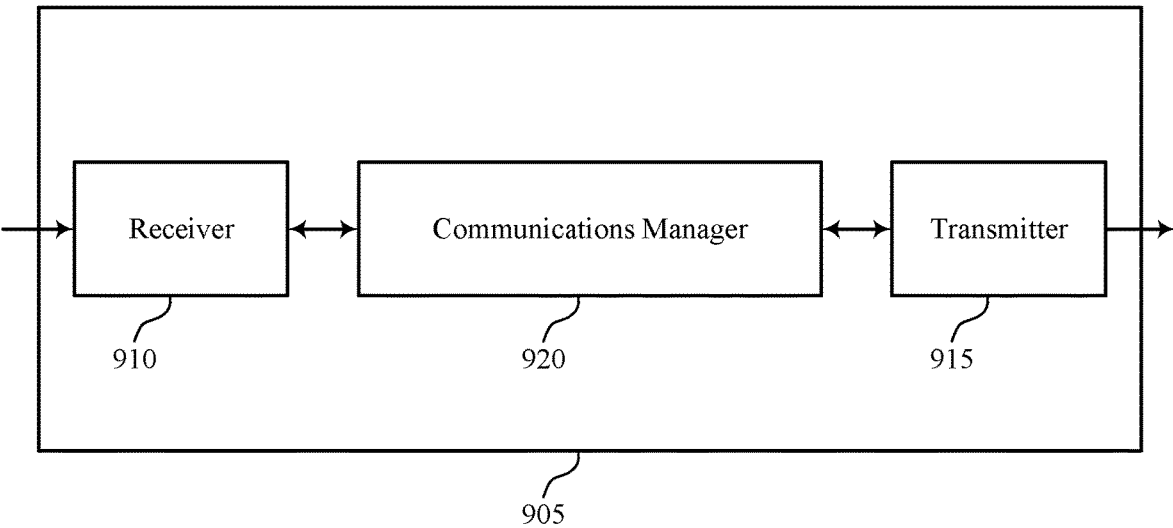
FIGS. 9 and 10 show block diagrams of devices that support control plane QoS management in accordance with one or more aspects of the present disclosure.

FIG. 9 shows a block diagram 900 of a device 905 that supports control plane QoS management in accordance with one or more aspects of the present disclosure. The device 905 may be an example of aspects of a network entity 105 as described herein. In some examples, the device 905 may be an example of aspects of a service domain, such as a service domain management function, as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of control plane QoS management as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 is capable of, configured to, or operable to support a means for obtaining first control information that is indicative of a service domain associated with control plane signaling, where the first control information is also indicative of a type of radio bearer of a set of multiple types of radio bearers and that is associated with the service domain, and where the first control information is further indicative of a QoS associated with the type of radio bearer. The communications manager 920 is capable of, configured to, or operable to support a means for outputting, to a UE and based on reception of the first control information, second control information that is indicative of the service domain, the type of radio bearer, and the QoS.

Additionally, or alternatively, the communications manager 920 may support wireless communication in accordance with examples as disclosed herein. For example, the communications manager 920 is capable of, configured to, or operable to support a means for outputting control information that is indicative of control plane signaling associated with the service domain, where the control information is also indicative of a type of radio bearer of a set of multiple types of radio bearers and that is associated with the service domain, and where the control information is further indicative of a QoS associated with the type of radio bearer. The communications manager 920 is capable of, configured to, or operable to support a means for communicating, via a radio bearer having the indicated type and in accordance with the indicated QoS, a control plane message associated with the service domain.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for more efficient utilization of communication resources and reduced power consumption by enabling variability and more granular control in message QoS, security, and priority based on related services.

Figure 10:
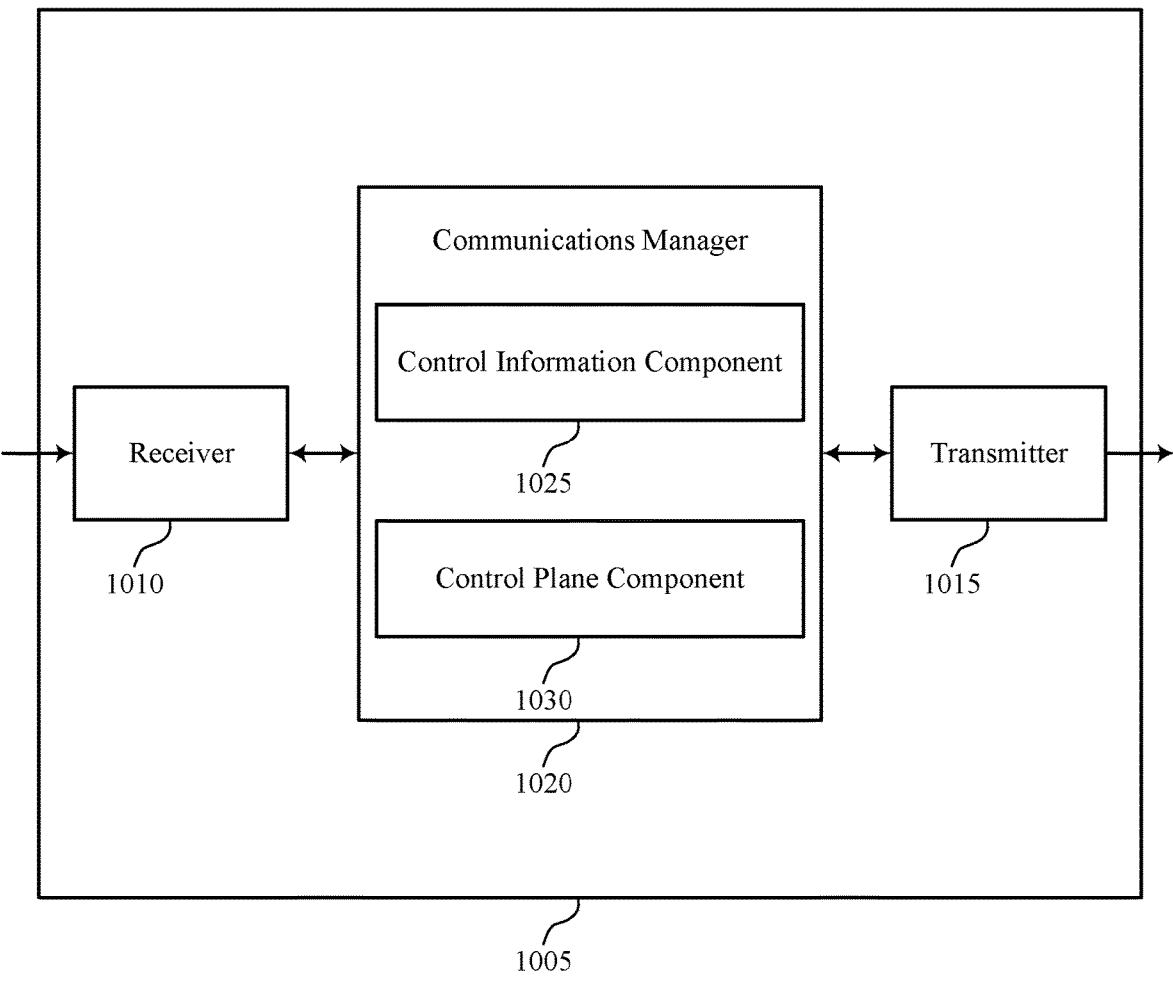

FIG. 10 shows a block diagram 1000 of a device 1005 that supports control plane QoS management in accordance with one or more aspects of the present disclosure. The device 1005 may be an example of aspects of a device 905 or a network entity 105, such as a service domain management function, as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of control plane QoS management as described herein. For example, the communications manager 1020 may include a control information component 1025 a control plane component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The control information component 1025 is capable of, configured to, or operable to support a means for obtaining first control information that is indicative of a service domain associated with control plane signaling, where the first control information is also indicative of a type of radio bearer of a set of multiple types of radio bearers and that is associated with the service domain, and where the first control information is further indicative of a QoS associated with the type of radio bearer. The control information component 1025 is capable of, configured to, or operable to support a means for outputting, to a UE and based on reception of the first control information, second control information that is indicative of the service domain, the type of radio bearer, and the QoS.

Additionally, or alternatively, the communications manager 1020 may support wireless communication in accordance with examples as disclosed herein. The control information component 1025 is capable of, configured to, or operable to support a means for outputting control information that is indicative of control plane signaling associated with the service domain, where the control information is also indicative of a type of radio bearer of a set of multiple types of radio bearers and that is associated with the service domain, and where the control information is further indicative of a QoS associated with the type of radio bearer. The control plane component 1030 is capable of, configured to, or operable to support a means for communicating, via a radio bearer having the indicated type and in accordance with the indicated QoS, a control plane message associated with the service domain.

Figure 11:
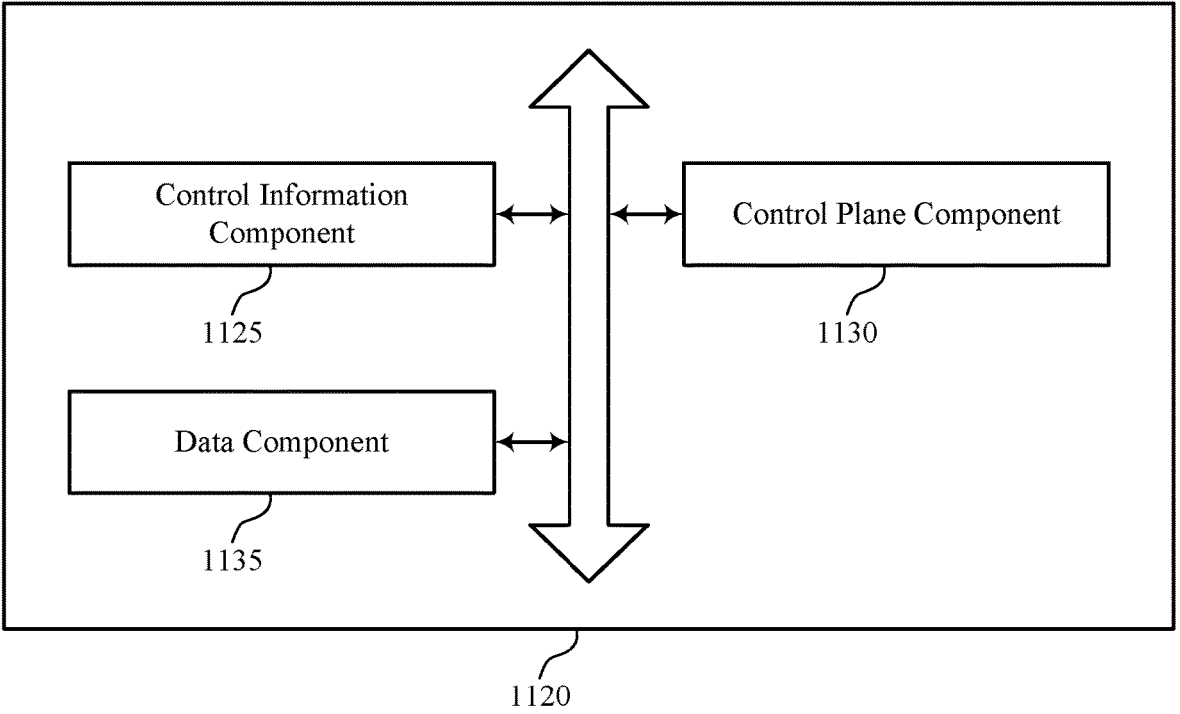
FIG. 11 shows a block diagram of a communications manager that supports control plane QoS management in accordance with one or more aspects of the present disclosure.

FIG. 11 shows a block diagram 1100 of a communications manager 1120 that supports control plane QoS management in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of control plane QoS management as described herein. For example, the communications manager 1120 may include a control information component 1125, a control plane component 1130, a data component 1135, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, such as a service domain management function, between devices, components, or virtualized components associated with a network entity 105), or any combination thereof.

The communications manager 1120 may support wireless communication in accordance with examples as disclosed herein. The control information component 1125 is capable of, configured to, or operable to support a means for obtaining first control information that is indicative of a service domain associated with control plane signaling, where the first control information is also indicative of a type of radio bearer of a set of multiple types of radio bearers and that is associated with the service domain, and where the first control information is further indicative of a QoS associated with the type of radio bearer. In some examples, the control information component 1125 is capable of, configured to, or operable to support a means for outputting, to a UE and based on reception of the first control information, second control information that is indicative of the service domain, the type of radio bearer, and the QoS.

In some examples, the control plane component 1130 is capable of, configured to, or operable to support a means for obtaining, from the UE via a radio bearer having the indicated type and in accordance with the indicated QoS, a control plane message associated with the service domain. In some examples, the control plane component 1130 is capable of, configured to, or operable to support a means for outputting, to the service domain, the control plane message via the radio bearer and in accordance with the indicated QoS.

In some examples, the radio bearer via which the control plane message is obtained and output is multiplexed with a second radio bearer having a second type of radio bearer. In some examples, the control plane message includes a NAS message. In some examples, the service domain is associated with NAS signaling.

In some examples, the control plane component 1130 is capable of, configured to, or operable to support a means for obtaining, from the service domain via a radio bearer having the indicated type and in accordance with the indicated QoS, a control plane message associated with the service domain. In some examples, the control plane component 1130 is capable of, configured to, or operable to support a means for outputting, to the UE, the control plane message via the radio bearer and in accordance with the indicated QoS.

In some examples, the data component 1135 is capable of, configured to, or operable to support a means for communicating, via a second radio bearer that is of a second type of radio bearer of the set of multiple types and that is associated with the service domain, data associated with the service domain, where the communicating is in accordance with the indicated QoS. In some examples, the data component 1135 is capable of, configured to, or operable to support a means for communicating, via the second radio bearer having the second type of radio bearer, data associated with the UE and in accordance with the indicated QoS; or both.

In some examples, to support outputting the second control information, the control information component 1125 is capable of, configured to, or operable to support a means for outputting the second control information to the UE via a RRC message. In some examples, the first control information, the second control information, or both, includes a first identifier associated with the service domain, a second identifier associated with a sub-service domain of the service domain, or a combination thereof.

In some examples, the control information component 1125 is capable of, configured to, or operable to support a means for obtaining third control information that is indicative of a second service domain associated with control plane signaling, where the second control information is also indicative of a second type of radio bearer of the set of multiple types of radio bearers and that is associated with the second service domain, and where the second control information is further indicative of a second QoS associated with the second type of radio bearer. In some examples, the control information component 1125 is capable of, configured to, or operable to support a means for outputting, to the UE and based on reception of the third control information, fourth control information that is indicative of the second service domain, the second type of radio bearer, and the second QoS.

In some examples, the control plane component 1130 is capable of, configured to, or operable to support a means for obtaining, from the UE via a radio bearer having the indicated second type and in accordance with the indicated second QoS, a control plane message associated with the second service domain. In some examples, the control plane component 1130 is capable of, configured to, or operable to support a means for outputting, to the second service domain, the control plane message via the second radio bearer and in accordance with the indicated second QoS.

In some examples, the indicated type of radio bearer is different from a second type of radio bearer associated with RRC signaling.

In some examples, to support obtaining the first control information, the control information component 1125 is capable of, configured to, or operable to support a means for obtaining the first control information from the service domain.

In some examples, the first control information, the second control information, or both, indicates that the set of multiple types of radio bearers are associated with the service domain. In some examples, each of the set of multiple types of radio bearers is associated with a corresponding QoS. In some examples, the first control information, the second control information, or both, are indicative of a level of security associated with the type of radio bearer. In some examples, the first control information, the second control information, or both, are indicative of a first priority level associated with the type of radio bearer. In some examples, the first priority level is higher than a second priority level associated with a second type of radio bearer.

In some examples, the service domain includes a service slice of a set of multiple service slices of a core network and associated with a service of a set of multiple services of the core network, a local service slice, a dedicated control service of a core network, or any combination thereof. In some examples, the network entity includes a DU configured to communicate with a core network including the service domain.

Additionally, or alternatively, the communications manager 1120 may support wireless communication in accordance with examples as disclosed herein. In some examples, the control information component 1125 is capable of, configured to, or operable to support a means for outputting control information that is indicative of control plane signaling associated with the service domain, where the control information is also indicative of a type of radio bearer of a set of multiple types of radio bearers and that is associated with the service domain, and where the control information is further indicative of a QoS associated with the type of radio bearer. The control plane component 1130 is capable of, configured to, or operable to support a means for communicating, via a radio bearer having the indicated type and in accordance with the indicated QoS, a control plane message associated with the service domain.

In some examples, the data component 1135 is capable of, configured to, or operable to support a means for communicating, via a second radio bearer that is of a second type of radio bearer of the set of multiple types of radio bearers and that is associated with the service domain, data associated with a UE and in accordance with the indicated QoS.

In some examples, to support communicating the data, the data component 1135 is capable of, configured to, or operable to support a means for communicating the data with the UE via a network entity.

In some examples, the control information includes a first identifier associated with the service domain, a second identifier associated with a sub-service domain of the service domain, or a combination thereof.

In some examples, the control plane component 1130 is capable of, configured to, or operable to support a means for multiplexing the radio bearer with a second radio bearer having a second type of radio bearer, where communicating the control plane message includes communicating the control plane message via the multiplexed radio bearer.

In some examples, the indicated type of radio bearer is different from a second type of radio bearer associated with RRC signaling.

In some examples, to support outputting the control information, the control information component 1125 is capable of, configured to, or operable to support a means for outputting the control information to a UE.

In some examples, the control information indicates that the set of multiple types of radio bearers are associated with the service domain. In some examples, each of the set of multiple types of radio bearers is associated with a corresponding QoS. In some examples, the control information is indicative of a level of security associated with the type of radio bearer. In some examples, obtaining the control plane message is in accordance with the level of security associated with the type of radio bearer. In some examples, the control information is indicative of a first priority level associated with the type of radio bearer. In some examples, communicating the control plane message is based on the first priority level being higher than a second priority level associated with a second type of radio bearer.

In some examples, to support communicating the control plane message, the control plane component 1130 is capable of, configured to, or operable to support a means for communicating the control plane message with a network entity.

In some examples, the service domain includes a service slice of a set of multiple service slices of a core network and associated with a service of a set of multiple services of the core network, a local service slice, a dedicated control service of a core network, or any combination thereof. In some examples, the service domain includes a service domain management function configured to output the control information and obtain the control plane message. In some examples, the control plane message includes a NAS message. In some examples, the service domain is associated with NAS signaling.

Figure 12:
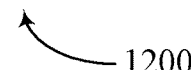
FIG. 12 shows a diagram of a system including a device that supports control plane QoS management in accordance with one or more aspects of the present disclosure.

FIG. 12 shows a diagram of a system 1200 including a device 1205 that supports control plane QoS management in accordance with one or more aspects of the present disclosure. The device 1205 may be an example of or include the components of a device 905, a device 1005, a network entity 105, such as a service domain management function, as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting control plane QoS management). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 is capable of, configured to, or operable to support a means for obtaining first control information that is indicative of a service domain associated with control plane signaling, where the first control information is also indicative of a type of radio bearer of a set of multiple types of radio bearers and that is associated with the service domain, and where the first control information is further indicative of a QoS associated with the type of radio bearer. The communications manager 1220 is capable of, configured to, or operable to support a means for outputting, to a UE and based on reception of the first control information, second control information that is indicative of the service domain, the type of radio bearer, and the QoS.

Additionally, or alternatively, the communications manager 1220 may support wireless communication in accordance with examples as disclosed herein. For example, the communications manager 1220 is capable of, configured to, or operable to support a means for outputting control information that is indicative of control plane signaling associated with the service domain, where the control information is also indicative of a type of radio bearer of a set of multiple types of radio bearers and that is associated with the service domain, and where the control information is further indicative of a QoS associated with the type of radio bearer. The communications manager 1220 is capable of, configured to, or operable to support a means for communicating, via a radio bearer having the indicated type and in accordance with the indicated QoS, a control plane message associated with the service domain.

By including or configuring the communications manager 1220 in accordance with examples as described herein, the device 1205 may support techniques for more efficient utilization of communication resources, reduced power con-sumption, improved coordination between devices, improved reliability, and increase security in signaling by enabling variability and more granular control in signal QoS, security, and priority based on related services.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of control plane QoS management as described herein, or the at least one processor 1235 and the at least one memory 1225 may be otherwise configured to, individually or collectively, perform or support such operations.

FIG. 13 shows a flowchart illustrating a method 1300 that supports control plane QoS management in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control information that is indicative of a service domain associated with control plane signaling, wherein the control information is also indicative of a type of radio bearer of a plurality of types of radio bearers and that is associated with the service domain, and wherein the control information is further indicative of a QoS associated with the type of radio bearer. The operations of block 1305 may be performed in accordance with examples as disclosed herein. In some examples, aspects of the operations of 1305 may be performed by a control information component 725 as described with reference to FIG. 7.

At 1310, the method may include communicating, via a radio bearer having the indicated type and in accordance with the indicated QoS, a control plane message associated with the service domain. The operations of block 1310 may be performed in accordance with examples as disclosed herein. In some examples, aspects of the operations of 1310 may be performed by a control plane component 730 as described with reference to FIG. 7.

FIG. 14 shows a flowchart illustrating a method 1400 that supports control plane QoS management in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions.

Additionally, or alternatively, the UE may perform aspects of the described functions using special-purpose hardware.

At 1405, the method may include receiving control information that is indicative of a service domain associated with control plane signaling, wherein the control information is also indicative of a type of radio bearer of a plurality of types of radio bearers and that is associated with the service domain, and wherein the control information is further indicative of a QoS associated with the type of radio bearer. The operations of block 1405 may be performed in accordance with examples as disclosed herein. In some examples, aspects of the operations of 1405 may be performed by a control information component 725 as described with reference to FIG. 7.

At 1410, the method may include communicating, via a radio bearer having the indicated type and in accordance with the indicated QoS, a control plane message associated with the service domain. The operations of block 1410 may be performed in accordance with examples as disclosed herein. In some examples, aspects of the operations of 1410 may be performed by a control plane component 730 as described with reference to FIG. 7.

At 1415, the method may include communicating, via a second radio bearer that is of a second type of radio bearer of the plurality of types and that is associated with the service domain, data associated with the service domain, wherein the communicating is in accordance with the indicated QoS. The operations of block 1415 may be performed in accordance with examples as disclosed herein. In some examples, aspects of the operations of 1415 may be performed by a data component 735 as described with reference to FIG. 7.

FIG. 15 shows a flowchart illustrating a method 1500 that supports control plane QoS management in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include obtaining first control information that is indicative of a service domain associated with control plane signaling, wherein the first control information is also indicative of a type of radio bearer of a plurality of types of radio bearers and that is associated with the service domain, and wherein the first control information is further indicative of a QoS associated with the type of radio bearer. The operations of block 1505 may be performed in accordance with examples as disclosed herein. In some examples, aspects of the operations of 1505 may be performed by a control information component 1125 as described with reference to FIG. 11.

At 1510, the method may include outputting, to a UE and based at least in part on reception of the first control information, second control information that is indicative of the service domain, the type of radio bearer, and the QoS. The operations of block 1510 may be performed in accordance with examples as disclosed herein. In some examples, aspects of the operations of 1510 may be performed by a control information component 1125 as described with reference to FIG. 11.

FIG. 16 shows a flowchart illustrating a method 1600 that supports control plane QoS management in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include obtaining first control information that is indicative of a service domain associated with control plane signaling, wherein the first control information is also indicative of a type of radio bearer of a plurality of types of radio bearers and that is associated with the service domain, and wherein the first control information is further indicative of a QoS associated with the type of radio bearer. The operations of block 1605 may be performed in accordance with examples as disclosed herein. In some examples, aspects of the operations of 1605 may be performed by a control information component 1125 as described with reference to FIG. 11.

At 1610, the method may include outputting, to a UE and based at least in part on reception of the first control information, second control information that is indicative of the service domain, the type of radio bearer, and the QoS. The operations of block 1610 may be performed in accordance with examples as disclosed herein. In some examples, aspects of the operations of 1610 may be performed by a control information component 1125 as described with reference to FIG. 11.

At 1615, the method may include obtaining, from the UE via a radio bearer having the indicated type and in accordance with the indicated QoS, a control plane message associated with the service domain. The operations of block 1615 may be performed in accordance with examples as disclosed herein. In some examples, aspects of the operations of 1615 may be performed by a control plane component 1130 as described with reference to FIG. 11.

At 1620, the method may include outputting, to the service domain, the control plane message via the radio bearer and in accordance with the indicated QoS. The operations of block 1620 may be performed in accordance with examples as disclosed herein. In some examples, aspects of the operations of 1620 may be performed by a control plane component 1130 as described with reference to FIG. 11.

FIG. 17 shows a flowchart illustrating a method 1700 that supports control plane QoS management in accordance with aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include obtaining first control information that is indicative of a service domain associated with control plane signaling, wherein the first control information is also indicative of a type of radio bearer of a plurality of types of radio bearers and that is associated with the service domain, and wherein the first control information is further indicative of a QoS associated with the type of radio bearer. The operations of block 1705 may be performed in accordance with examples as disclosed herein. In some examples, aspects of the operations of 1705 may be performed by a control information component 1125 as described with reference to FIG. 11.

At 1710, the method may include outputting, to a UE and based at least in part on reception of the first control information, second control information that is indicative of the service domain, the type of radio bearer, and the QoS. The operations of block 1710 may be performed in accordance with examples as disclosed herein. In some examples, aspects of the operations of 1710 may be performed by a control information component 1125 as described with reference to FIG. 11.

At 1715, the method may include obtaining, from the service domain via a radio bearer having the indicated type and in accordance with the indicated QoS, a control plane message associated with the service domain. The operations of block 1715 may be performed in accordance with examples as disclosed herein. In some examples, aspects of the operations of 1715 may be performed by a control plane component 1130 as described with reference to FIG. 11.

At 1720, the method may include outputting, to the UE, the control plane message via the radio bearer and in accordance with the indicated QoS. The operations of block 1720 may be performed in accordance with examples as disclosed herein. In some examples, aspects of the operations of 1720 may be performed by a control plane component 1130 as described with reference to FIG. 11.

FIG. 18 shows a flowchart illustrating a method 1800 that supports control plane QoS management in accordance with aspects of the present disclosure. The operations of the method 1800 may be implemented by a service domain, such as a network entity (e.g., a service domain management function of a service domain), or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include outputting control information that is indicative of control plane signaling associated with the service domain, wherein the control information is also indicative of a type of radio bearer of a plurality of types of radio bearers and that is associated with the service domain, and wherein the control information is further indicative of a QoS associated with the type of radio bearer. The operations of block 1805 may be performed in accordance with examples as disclosed herein. In some examples, aspects of the operations of 1805 may be performed by a control information component 1125 as described with reference to FIG. 11.

At 1810, the method may include communicating, via a radio bearer having the indicated type and in accordance with the indicated QoS, a control plane message associated with the service domain. The operations of block 1810 may be performed in accordance with examples as disclosed herein. In some examples, aspects of the operations of 1810 may be performed by a control plane component 1130 as described with reference to FIG. 11.

The following provides an overview of aspects of the present disclosure:

Aspect 1: A method for wireless communication by a UE, comprising: receiving control information that is indicative of a service domain associated with control plane signaling, wherein the control information is also indicative of a type of radio bearer of a plurality of types of radio bearers and that is associated with the service domain, and wherein the control information is further indicative of a quality of service associated with the type of radio bearer; and communicating, via a radio bearer having the indicated type and in accordance with the indicated quality of service, a control plane message associated with the service domain.

Aspect 2: The method of aspect 1, further comprising: communicating, via a second radio bearer that is of a second type of radio bearer of the plurality of types and that is associated with the service domain, data associated with the service domain, wherein the communicating is in accordance with the indicated quality of service.

Aspect 3: The method of aspect 2, wherein communicating the data comprises: communicating the data with the service domain via a network entity.

Aspect 4: The method of any of aspects 1 through 3, wherein receiving the control information comprises: receiving the control information from a network entity via a radio resource control message.

Aspect 5: The method of any of aspects 1 through 4, further comprising: receiving second control information that is indicative of a second service domain associated with control plane signaling, wherein the second control information is also indicative of a second type of radio bearer of the plurality of types of radio bearers and that is associated with the second service domain, and wherein the second control information is further indicative of a second quality of service associated with the second type of radio bearer; and communicating, via a second radio bearer having the indicated second type and in accordance with the indicated second quality of service, a second control plane message associated with the second service domain.

Aspect 6: The method of any of aspects 1 through 5, wherein the control information comprises a first identifier associated with the service domain, a second identifier associated with a sub-service domain of the service domain, or a combination thereof.

Aspect 7: The method of any of aspects 1 through 6, further comprising: multiplexing the radio bearer with a second radio bearer having a second type of radio bearer, wherein communicating the control plane message comprises communicating the control plane message via the multiplexed radio bearer.

Aspect 8: The method of any of aspects 1 through 7, wherein the indicated type of radio bearer is different from a second type of radio bearer communicated via radio resource control signaling.

Aspect 9: The method of any of aspects 1 through 8, wherein receiving the control information comprises: receiving the control information from the service domain.

Aspect 10: The method of any of aspects 1 through 9, wherein the control information indicates a subset of the plurality of types of radio bearers that are associated with the service domain and a respective quality of service associated with each type of the subset.

Aspect 11: The method of any of aspects 1 through 10, wherein: the control information is indicative of a level of security associated with the type of radio bearer, and communicating the control plane message is in accordance with the level of security associated with the type of radio bearer.

Aspect 12: The method of any of aspects 1 through 11, wherein: the control information is indicative of a first priority level associated with the type of radio bearer, and communicating the control plane message is based at least in part on the first priority level being higher than a second priority level associated with a second type of radio bearer.

Aspect 13: The method of any of aspects 1 through 12, wherein communicating the control plane message comprises: communicating the control plane message with the service domain via a network entity.

Aspect 14: The method of any of aspects 1 through 13, wherein the service domain comprises a service slice of a plurality of service slices of a core network and associated with a service of a plurality of services of the core network, a local service slice, a dedicated control service of the core network, or any combination thereof.

Aspect 15: The method of any of aspects 1 through 14, wherein: the control plane message comprises a non-access stratum message, and the service domain is associated with non-access stratum signaling.

Aspect 16: A method for wireless communication by a network entity, comprising: obtaining first control information that is indicative of a service domain associated with control plane signaling, wherein the first control information is also indicative of a type of radio bearer of a plurality of types of radio bearers and that is associated with the service domain, and wherein the first control information is further indicative of a quality of service associated with the type of radio bearer; and outputting, to a UE and based at least in part on reception of the first control information, second control information that is indicative of the service domain, the type of radio bearer, and the quality of service.

Aspect 17: The method of aspect 16, further comprising: obtaining, from the UE via a radio bearer having the indicated type and in accordance with the indicated quality of service, a control plane message associated with the service domain; and outputting, to the service domain, the control plane message via the radio bearer and in accordance with the indicated quality of service.

Aspect 18: The method of aspect 17, wherein the radio bearer via which the control plane message is obtained and output is multiplexed with a second radio bearer having a second type of radio bearer.

Aspect 19: The method of any of aspects 17 through 18, wherein: the control plane message comprises a non-access stratum message, and the service domain is associated with non-access stratum signaling.

Aspect 20: The method of any of aspects 16 through 19, further comprising: obtaining, from the service domain via a radio bearer having the indicated type and in accordance with the indicated quality of service, a control plane message associated with the service domain; and outputting, to the UE, the control plane message via the radio bearer and in accordance with the indicated quality of service.

Aspect 21: The method of any of aspects 16 through 20, further comprising: communicating, via a second radio bearer that is of a second type of radio bearer of the plurality of types and that is associated with the service domain, data associated with the service domain, wherein the communicating is in accordance with the indicated quality of service; or communicating, via the second radio bearer having the second type of radio bearer, data associated with the UE and in accordance with the indicated quality of service; or both.

Aspect 22: The method of any of aspects 16 through 21, wherein outputting the second control information comprises: outputting the second control information to the UE via a radio resource control message.

Aspect 23: The method of aspect 22, wherein the first control information, the second control information, or both, comprises a first identifier associated with the service domain, a second identifier associated with a sub-service domain of the service domain, or a combination thereof.

Aspect 24: The method of any of aspects 16 through 23, further comprising: obtaining third control information that is indicative of a second service domain associated with control plane signaling, wherein the second control information is also indicative of a second type of radio bearer of the plurality of types of radio bearers and that is associated with the second service domain, and wherein the second control information is further indicative of a second quality of service associated with the second type of radio bearer; and outputting, to the UE and based at least in part on reception of the third control information, fourth control information that is indicative of the second service domain, the second type of radio bearer, and the second quality of service.

Aspect 25: The method of aspect 24, further comprising: obtaining, from the UE via a radio bearer having the indicated second type and in accordance with the indicated second quality of service, a control plane message associated with the second service domain; and outputting, to the second service domain, the control plane message via the second radio bearer and in accordance with the indicated second quality of service.

Aspect 26: The method of any of aspects 16 through 25, wherein the indicated type of radio bearer is different from a second type of radio bearer associated with radio resource control.

Aspect 27: The method of any of aspects 16 through 26, wherein obtaining the first control information comprises: obtaining the first control information from the service domain.

Aspect 28: The method of any of aspects 16 through 27, wherein: the first control information, the second control information, or both, indicates that the plurality of types of radio bearers are associated with the service domain, and each of the plurality of types of radio bearers is associated with a corresponding quality of service.

Aspect 29: The method of any of aspects 16 through 28, wherein the first control information, the second control information, or both, are indicative of a level of security associated with the type of radio bearer.

Aspect 30: The method of any of aspects 16 through 29, wherein the first control information, the second control information, or both, are indicative of a first priority level associated with the type of radio bearer, the first priority level is higher than a second priority level associated with a second type of radio bearer.

Aspect 31: The method of any of aspects 16 through 30, wherein the service domain comprises a service slice of a plurality of service slices of a core network and associated with a service of a plurality of services of the core network, a local service slice, a dedicated control service of a core network, or any combination thereof.

Aspect 32: The method of any of aspects 16 through 31, wherein the network entity comprises a DU configured to communicate with a core network comprising the service domain.

Aspect 33: A method for wireless communication by a service domain, comprising: outputting control information that is indicative of control plane signaling associated with the service domain, wherein the control information is also indicative of a type of radio bearer of a plurality of types of radio bearers and that is associated with the service domain, and wherein the control information is further indicative of a quality of service associated with the type of radio bearer; and communicating, via a radio bearer having the indicated type and in accordance with the indicated quality of service, a control plane message associated with the service domain.

Aspect 34: The method of aspect 33, further comprising: communicating, via a second radio bearer that is of a second type of radio bearer of the plurality of types of radio bearers and that is associated with the service domain, data associated with a UE and in accordance with the indicated quality of service.

Aspect 35: The method of aspect 34, wherein communicating the data comprises: communicating the data with the UE via a network entity.

Aspect 36: The method of any of aspects 33 through 35, wherein the control information comprises a first identifier associated with the service domain, a second identifier associated with a sub-service domain of the service domain, or a combination thereof.

Aspect 37: The method of any of aspects 33 through 36, further comprising: multiplexing the radio bearer with a second radio bearer having a second type of radio bearer, wherein communicating the control plane message comprises communicating the control plane message via the multiplexed radio bearer.

Aspect 38: The method of any of aspects 33 through 37, wherein the indicated type of radio bearer is different from a second type of radio bearer associated with radio resource control.

Aspect 39: The method of any of aspects 33 through 38, wherein outputting the control information comprises: outputting the control information to a UE.

Aspect 40: The method of any of aspects 33 through 39, wherein: the control information indicates that the plurality of types of radio bearers are associated with the service domain, and each of the plurality of types of radio bearers is associated with a corresponding quality of service.

Aspect 41: The method of any of aspects 33 through 40, wherein: the control information is indicative of a level of security associated with the type of radio bearer, and obtaining the control plane message is in accordance with the level of security associated with the type of radio bearer.

Aspect 42: The method of any of aspects 33 through 41, wherein: the control information is indicative of a first priority level associated with the type of radio bearer, and communicating the control plane message is based at least in part on the first priority level being higher than a second priority level associated with a second type of radio bearer.

Aspect 43: The method of any of aspects 33 through 42, wherein communicating the control plane message comprises: communicating the control plane message with a second network entity.

Aspect 44: The method of any of aspects 33 through 43, wherein the service domain comprises a service slice of a plurality of service slices of a core network and associated with a service of a plurality of services of the core network, a local service slice, a dedicated control service of a core network, or any combination thereof.

Aspect 45: The method of any of aspects 33 through 44, wherein the service domain comprises a service domain management function configured to output the control information and obtain the control plane message.

Aspect 46: The method of any of aspects 33 through 45, wherein: the control plane message comprises a non-access stratum message, and the service domain is associated with non-access stratum signaling.

Aspect 47: A UE for wireless communication, comprising one or more memories storing processor-executable code, and one or more processors coupled with the one or more memories and individually or collectively operable to execute the code to cause the UE to perform a method of any of aspects 1 through 15.

Aspect 48: A UE for wireless communication, comprising at least one means for performing a method of any of aspects 1 through 15.

Aspect 49: A non-transitory computer-readable medium storing code for wireless communication, the code comprising instructions executable by one or more processors to perform a method of any of aspects 1 through 15.

Aspect 50: A network entity for wireless communication, comprising one or more memories storing processor-executable code, and one or more processors coupled with the one or more memories and individually or collectively operable to execute the code to cause the network entity to perform a method of any of aspects 16 through 32.

Aspect 51: A network entity for wireless communication, comprising at least one means for performing a method of any of aspects 16 through 32.

Aspect 52: A non-transitory computer-readable medium storing code for wireless communication, the code comprising instructions executable by one or more processors to perform a method of any of aspects 16 through 32.

Aspect 53: A service domain for wireless communication, comprising one or more memories storing processor-executable code, and one or more processors coupled with the one or more memories and individually or collectively operable to execute the code to cause the service domain to perform a method of any of aspects 33 through 46.

Aspect 54: A service domain for wireless communication, comprising at least one means for performing a method of any of aspects 33 through 46.

Aspect 55: A non-transitory computer-readable medium storing code for wireless communication, the code comprising instructions executable by one or more processors to perform a method of any of aspects 33 through 46.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive, from a network entity, control information that is indicative of a service domain associated with control plane signaling, wherein the control information is also indicative of a type of radio bearer of a plurality of types of radio bearers and that is associated with the service domain, and wherein the control information is further indicative of a quality of service associated with the type of radio bearer; and
communicate, via a radio bearer having the indicated type and in accordance with the indicated quality of service, a control plane message associated with the service domain.

2. The UE of claim 1, wherein the one or more processors are individually or collectively further operable to execute the code to cause the UE to:
communicate, via a second radio bearer that is of a second type of radio bearer of the plurality of types and that is associated with the service domain, data associated with the service domain, wherein the communicating is in accordance with the indicated quality of service.

3. The UE of claim 2, wherein, to communicate the data or the control plane message, the one or more processors are individually or collectively operable to execute the code to cause the UE to:
communicate the data or the control plane message with the service domain via the network entity.

4. The UE of claim 1, wherein, to receive the control information, the one or more processors are individually or collectively operable to execute the code to cause the UE to:
receive the control information from the network entity via a radio resource control message.

5. The UE of claim 1, wherein the one or more processors are individually or collectively further operable to execute the code to cause the UE to:
receive second control information that is indicative of a second service domain associated with control plane signaling, wherein the second control information is also indicative of a second type of radio bearer of the plurality of types of radio bearers and that is associated with the second service domain, and wherein the second control information is further indicative of a second quality of service associated with the second type of radio bearer; and
communicate, via a second radio bearer having the indicated second type and in accordance with the indicated second quality of service, a second control plane message associated with the second service domain.

6. The UE of claim 1, wherein the control information comprises a first identifier associated with the service domain, a second identifier associated with a sub-service domain of the service domain, or a combination thereof.

7. The UE of claim 1, wherein the one or more processors are individually or collectively further operable to execute the code to cause the UE to:
multiplex the radio bearer with a second radio bearer having a second type of radio bearer, wherein communicating the control plane message comprises communicating the control plane message via the multiplexed radio bearer.

8. The UE of claim 1, wherein the indicated type of radio bearer is different from a second type of radio bearer communicated via radio resource control signaling.

9. The UE of claim 1, wherein, to receive the control information, the one or more processors are individually or collectively operable to execute the code to cause the UE to:
receive the control information from the service domain.

10. The UE of claim 1, wherein the control information indicates a subset of the plurality of types of radio bearers that are associated with the service domain and a respective quality of service associated with each type of the subset.

11. The UE of claim 1, wherein:
the control information is indicative of a level of security associated with the type of radio bearer, and
communicating the control plane message is in accordance with the level of security associated with the type of radio bearer.

12. The UE of claim 1, wherein:
the control information is indicative of a first priority level associated with the type of radio bearer, and
communicating the control plane message is based at least in part on the first priority level being higher than a second priority level associated with a second type of radio bearer.

13. The UE of claim 1, wherein, to communicate the control plane message, the one or more processors are individually or collectively operable to execute the code to cause the UE to:
communicate the control plane message with the service domain via the network entity.

14. The UE of claim 1, wherein the service domain comprises a service slice of a plurality of service slices of a core network and associated with a service of a plurality of services of the core network, a local service slice, a dedicated control service of the core network, or any combination thereof.

15. The UE of claim 1, wherein the control plane message comprises a non-access stratum message, and wherein the service domain is associated with non-access stratum signaling.

16. A network entity, comprising:
one or more memories storing processor-executable code; and
one or more processors coupled with the one or more memories and individually or collectively operable to execute the code to cause the network entity to:
obtain, from a service domain, first control information that is indicative of the service domain associated with control plane signaling, wherein the first control information is also indicative of a type of radio bearer of a plurality of types of radio bearers and that is associated with the service domain, and wherein the first control information is further indicative of a quality of service associated with the type of radio bearer; and
output, to a user equipment (UE) and based at least in part on reception of the first control information, second control information that is indicative of the service domain, the type of radio bearer, and the quality of service.

17. The network entity of claim 16, wherein the one or more processors are individually or collectively further operable to execute the code to cause the network entity to:

obtain, from the UE via a radio bearer having the indicated type and in accordance with the indicated quality of service, a control plane message associated with the service domain; and output, to the service domain, the control plane message via the radio bearer and in accordance with the indicated quality of service.

18. The network entity of claim 17, wherein the radio bearer via which the control plane message is obtained and output is multiplexed with a second radio bearer having a second type of radio bearer.

19. The network entity of claim 17, wherein the control plane message comprises a non-access stratum message, and wherein the service domain is associated with non-access stratum signaling.

20. The network entity of claim 16, wherein, to output the second control information, the one or more processors are individually or collectively operable to execute the code to cause the network entity to:

output the second control information to the UE via a radio resource control message.

21. The network entity of claim 20, wherein the first control information, the second control information, or both, comprises a first identifier associated with the service domain, a second identifier associated with a sub-service domain of the service domain, or a combination thereof.

22. The network entity of claim 16, wherein the one or more processors are individually or collectively further operable to execute the code to cause the network entity to:

obtain third control information that is indicative of a second service domain associated with control plane signaling, wherein the second control information is also indicative of a second type of radio bearer of the plurality of types of radio bearers and that is associated with the second service domain, and wherein the second control information is further indicative of a second quality of service associated with the second type of radio bearer; and output, to the UE and based at least in part on reception of the third control information, fourth control information that is indicative of the second service domain, the second type of radio bearer, and the second quality of service.

23. The network entity of claim 22, wherein the one or more processors are individually or collectively further operable to execute the code to cause the network entity to:

obtain, from the UE via a radio bearer having the indicated second type and in accordance with the indicated second quality of service, a control plane message associated with the second service domain; and output, to the second service domain, the control plane message via the second radio bearer and in accordance with the indicated second quality of service.

24. The network entity of claim 16, wherein the one or more processors are individually or collectively further operable to execute the code to cause the network entity to:

obtain, from the service domain via a radio bearer having the indicated type and in accordance with the indicated quality of service, a control plane message associated with the service domain; and output, to the UE, the control plane message via the radio bearer and in accordance with the indicated quality of service.

25. The network entity of claim 16, wherein the one or more processors are individually or collectively further operable to execute the code to cause the network entity to:

communicate, via a second radio bearer that is of a second type of radio bearer of the plurality of types and that is associated with the service domain, data associated with the service domain, wherein the communicating is in accordance with the indicated quality of service; or communicate, via the second radio bearer having the second type of radio bearer, data associated with the UE and in accordance with the indicated quality of service; or both.

26. The network entity of claim 16, wherein the indicated type of radio bearer is different from a second type of radio bearer associated with radio resource control signaling.

27. The network entity of claim 16, wherein, to obtain the first control information, the one or more processors are individually or collectively operable to execute the code to cause the network entity to:

obtain the first control information from the service domain.

28. The network entity of claim 16, wherein the first control information, the second control information, or both, indicates that the plurality of types of radio bearers are associated with the service domain, wherein each of the plurality of types of radio bearers is associated with a corresponding quality of service.

29. The network entity of claim 16, wherein the first control information, the second control information, or both, are indicative of a level of security associated with the type of radio bearer.

30. The network entity of claim 16, wherein the first control information, the second control information, or both, are indicative of a first priority level associated with the type of radio bearer, wherein the first priority level is higher than a second priority level associated with a second type of radio bearer.

31. The network entity of claim 16, wherein the service domain comprises a service slice of a plurality of service slices of a core network and associated with a service of a plurality of services of the core network, a local service slice, a dedicated control service of the core network, or any combination thereof.

32. The network entity of claim 16, wherein the network entity comprises a DU configured to communicate with a core network comprising the service domain.

33. A service domain, comprising:

one or more memories storing processor-executable code; and one or more processors coupled with the one or more memories and individually or collectively operable to execute the code to cause the service domain to:

output control information that is indicative of control plane signaling associated with the service domain, wherein the control information is also indicative of a type of radio bearer of a plurality of types of radio bearers and that is associated with the service domain, and wherein the control information is further indicative of a quality of service associated with the type of radio bearer; and communicate, via a radio bearer having the indicated type and in accordance with the indicated quality of service, a control plane message associated with the service domain.

34. The service domain of claim 33, wherein the one or more processors are individually or collectively further operable to execute the code to cause the service domain to:

communicate, via a second radio bearer that is of a second type of radio bearer of the plurality of types of radio bearers and that is associated with the service domain, data associated with a user equipment (UE) and in accordance with the indicated quality of service.

35. The service domain of claim 34, wherein, to communicate the data or the control plane message, the one or more processors are individually or collectively operable to execute the code to cause the service domain to:

communicate the data or the control plane message with the UE via a network entity.

36. The service domain of claim 33, wherein the control information comprises a first identifier associated with the service domain, a second identifier associated with a sub-service domain of the service domain, or a combination thereof.

37. The service domain of claim 33, wherein the one or more processors are individually or collectively further operable to execute the code to cause the service domain to:

multiplex the radio bearer with a second radio bearer having a second type of radio bearer, wherein communicating the control plane message comprises communicating the control plane message via the multiplexed radio bearer.

38. The service domain of claim 33, wherein the indicated type of radio bearer is different from a second type of radio bearer associated with radio resource control signaling.

39. The service domain of claim 33, wherein, to output the control information, the one or more processors are individually or collectively operable to execute the code to cause the service domain to:

output the control information to a user equipment (UE).

40. The service domain of claim 33, wherein the control information indicates that the plurality of types of radio bearers are associated with the service domain, wherein each of the plurality of types of radio bearers is associated with a corresponding quality of service.

41. The service domain of claim 33, wherein the control information is indicative of a level of security associated with the type of radio bearer, wherein obtaining the control plane message is in accordance with the level of security associated with the type of radio bearer.

42. The service domain of claim 33, wherein the control information is indicative of a first priority level associated with the type of radio bearer, wherein communicating the control plane message is based at least in part on the first priority level being higher than a second priority level associated with a second type of radio bearer.

43. The service domain of claim 33, wherein, to communicate the control plane message, the one or more processors are individually or collectively operable to execute the code to cause the service domain to:

communicate the control plane message with a network entity.

44. The service domain of claim 33, wherein the service domain comprises a service slice of a plurality of service slices of a core network and associated with a service of a plurality of services of the core network, a local service slice, a dedicated control service of a core network, or any combination thereof.

45. The service domain of claim 33, wherein the service domain comprises a service domain management function configured to output the control information and obtain the control plane message.

46. The service domain of claim 33, wherein the control plane message comprises a non-access stratum message, and wherein the service domain is associated with non-access stratum signaling.

47. A method for wireless communication by a user equipment (UE), comprising:

receiving, from a network entity, control information that is indicative of a service domain associated with control plane signaling, wherein the control information is also indicative of a type of radio bearer of a plurality of types of radio bearers and that is associated with the service domain, and wherein the control information is further indicative of a quality of service associated with the type of radio bearer; and communicating, via a radio bearer having the indicated type and in accordance with the indicated quality of service, a control plane message associated with the service domain.

48. A method for wireless communication by a network entity, comprising:

obtaining, from a service domain, first control information that is indicative of the service domain associated with control plane signaling, wherein the first control information is also indicative of a type of radio bearer of a plurality of types of radio bearers and that is associated with the service domain, and wherein the first control information is further indicative of a quality of service associated with the type of radio bearer; and outputting, to a user equipment (UE) and based at least in part on reception of the first control information, second control information that is indicative of the service domain, the type of radio bearer, and the quality of service.

49. A method for wireless communication by a service domain, comprising:

outputting control information that is indicative of control plane signaling associated with the service domain, wherein the control information is also indicative of a type of radio bearer of a plurality of types of radio bearers and that is associated with the service domain, and wherein the control information is further indicative of a quality of service associated with the type of radio bearer; and communicating, via a radio bearer having the indicated type and in accordance with the indicated quality of service, a control plane message associated with the service domain.

* * * * *